(12) United States Patent
Halbur et al.

(10) Patent No.: US 8,070,068 B2
(45) Date of Patent: Dec. 6, 2011

(54) TRANSACTION PRODUCT WITH SLIDE VIEWER

(75) Inventors: Ted C. Halbur, Lino Lakes, MN (US); Adam W. Reynolds, Minneapolis, MN (US); Jessica M. Trebrake, Rosemount, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 372 days.

(21) Appl. No.: 12/340,433

(22) Filed: Dec. 19, 2008

(65) Prior Publication Data

US 2010/0155490 A1   Jun. 24, 2010

(51) Int. Cl.
*G06K 19/00* (2006.01)

(52) U.S. Cl. ........ 235/487; 235/379; 235/380; 235/381; 235/441; 235/492

(58) Field of Classification Search .................. 235/379, 235/380, 381, 441, 492, 487
See application file for complete search history.

(56) References Cited

U.S. PATENT DOCUMENTS

| | | | |
|---|---|---|---|
| 2,283,777 A | 5/1942 | Wendling | |
| 2,487,459 A | 11/1949 | Mast | |
| 2,511,334 A | 6/1950 | Gruber | |
| 2,757,573 A | 8/1956 | Turner | |
| 2,789,460 A | 4/1957 | Kaufman | |
| 2,933,015 A | 4/1960 | Somach | |
| 3,490,171 A * | 1/1970 | Martin et al. | ................. 446/408 |
| 3,590,498 A | 7/1971 | Landzerg | |
| 4,116,533 A | 9/1978 | Nerlich | |
| 4,402,580 A | 9/1983 | Ross | |
| 4,549,785 A | 10/1985 | Vitrac | |
| 4,558,528 A | 12/1985 | Cunningham | |
| 4,846,553 A | 7/1989 | Rice | |
| 4,881,334 A | 11/1989 | Brown | |
| 4,968,125 A | 11/1990 | Rodriquez | |
| 5,412,199 A | 5/1995 | Finkelstein | |
| D387,802 S | 12/1997 | Finkelstein et al. | |
| 5,769,684 A * | 6/1998 | Lou | ............................... 446/219 |
| 6,028,700 A | 2/2000 | Fraenkel | |
| 6,381,416 B2 * | 4/2002 | Manico et al. | ................ 396/207 |
| 6,390,372 B1 | 5/2002 | Waters | |

(Continued)

OTHER PUBLICATIONS

Wade, Will, "First Data Sees Sticker Device as Mobile-Pay Bridge," American Banker, Aug. 25, 2008, 2 pages.

(Continued)

*Primary Examiner* — Daniel Hess
*Assistant Examiner* — Michael Andler
(74) *Attorney, Agent, or Firm* — Griffiths & Seaton PLLC

(57) ABSTRACT

A transaction product includes a lens, a slide, an actuating mechanism, a housing and an account identifier. The slide depicts a plurality of scenes, and each of the plurality of scenes is separately depicted on a different portion of the slide. The actuating mechanism is positioned to cause movement of the slide to change which one of the plurality of scenes aligns with and is viewable through the lens at a given time. The housing substantially encloses the lens, the slide and the actuating mechanism. The account identifier is coupled with the housing and links the transaction product to an account or record. The account identifier is machine readable by a point-of-sale terminal such that value can be added to or deducted from the account using the account identifier. Other product, cards, assemblies and associated methods are also disclosed.

24 Claims, 13 Drawing Sheets

U.S. PATENT DOCUMENTS

| | | | |
|---|---|---|---|
| 6,614,604 | B1 | 9/2003 | Budde |
| 7,314,179 | B1 | 1/2008 | Halbur et al. |
| 2002/0088855 | A1* | 7/2002 | Hodes .......................... 235/385 |
| 2002/0143697 | A1 | 10/2002 | Gotfried |
| 2003/0106935 | A1 | 6/2003 | Burchette, Jr. |
| 2007/0170263 | A1 | 7/2007 | Waters |
| 2008/0149728 | A1 | 6/2008 | Lindahl et al. |

OTHER PUBLICATIONS

"Contactless Payments: Consumer Trends and Usage Preferences," firstdata.com, 2008, 2 pages.

"Payment Processing: Mobile Commerce and the M-Wallet: A Market Brief," Retail Solutions Online, May 10, 2007, 2 pages.

De Wijs—Design and Production of Stereoscopic Instruments, "Manual 10-slide outdoor viewer," Jul. 2006, 8 pages.

De Wijs—Design and Production of Stereoscopic Instruments, "User Manual for the Panel Viewer," May 25, 2007, 6 pages.

U.S. Appl. No. 11/931,961, entitled "Transaction Product With Generator," as filed on Oct. 31, 2007.

U.S. Appl. No. 11/965,475, entitled "Transaction Card With Enclosed Chamber," as filed on Dec. 27, 2007.

U.S. Appl. No. 12/138,727, entitled "Transaction Card With Movable Member," as filed on Jun. 13, 2008.

U.S. Appl. No. 12/262,324, entitled "Transaction Product With Camera," as filed on Oct. 31, 2008.

Fisher-Price View-Master, http://www.fisher-price.com/fp.aspx?t=page&a=go&s=viewmaster&p=landing_flash&site=us, publicly available at least more than one year prior to Dec. 19, 2008.

3DWORLDSHOP, Red Model J View-Master viewer, new in original packaging, publicly available for sale at least as early as 1982, 3 pages.

* cited by examiner

TRANSACTION PRODUCT WITH SLIDE VIEWER

BACKGROUND OF THE INVENTION

Stored-value cards and other transaction products come in many forms. A gift card, for example, is a type of stored-value card that includes pre-loaded or selectively loaded monetary value. In one example, a customer buys a gift card having a specified value for presentation as a gift for another person. In another example, a customer is offered a gift card as an incentive to make a purchase. A gift card, like other stored-value cards, can be "recharged" or "reloaded" at the direction of the bearer. The balance associated with the card declines as the card is used, encouraging repeat visits to the retailer or other provider issuing the card. Additionally, the card generally remains in the user's purse or wallet, serving as an advertisement or reminder to revisit the associated retailer. Transaction products provide a number of advantages to both the consumer and the retailer.

SUMMARY OF THE INVENTION

One aspect of the present invention relates to a transaction product including a lens, a slide, an actuating mechanism, a housing and an account identifier. The slide depicts a plurality of scenes, and each of the plurality of scenes is separately depicted on a different portion of the slide. The actuating mechanism is positioned to cause movement of the slide to change which one of the plurality of scenes aligns with and is viewable through the lens at a given time. The housing substantially encloses the lens, the slide and the actuating mechanism. The account identifier is coupled with the housing and links the transaction product to an account. The account identifier is machine readable by a point-of-sale terminal such that value can be added to or deducted from the account using the account identifier. Other related products, assemblies and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

A transaction product is adapted for making purchases of goods and/or services at, for example, a retail store or website and/or for storing non-monetary value adapted for redemption toward the use of goods and/or services (e.g., a phone card). According to one embodiment, an original consumer buys a transaction card in the form of a gift card to give a recipient who in turn is able to use the transaction product at a retail store or setting to pay for the goods and/or services.

A transaction product, according to embodiments of the present invention, provides the consumer and/or other end recipient with a slide viewer in addition to the ability to pay for or use goods and/or services with the transaction product. In particular, in one embodiment, the transaction product includes a slide depicting a plurality of distinct visual scenes, a lens, and an actuation mechanism for changing which of the plurality of the visual scenes aligns with and is viewable through the lens. Accordingly, a bearer of the transaction product is able to selectively and individually view the plurality of distinct visual scenes in a manner educating and/or amusing the product bearer. As such, transaction products (e.g., gift cards and other stored-value cards, credit cards and debit cards) according to embodiments of the present invention function as a slide viewer in addition to providing financial functionality in the form of value available toward the purchase or use of goods and/or services.

Figure 7:
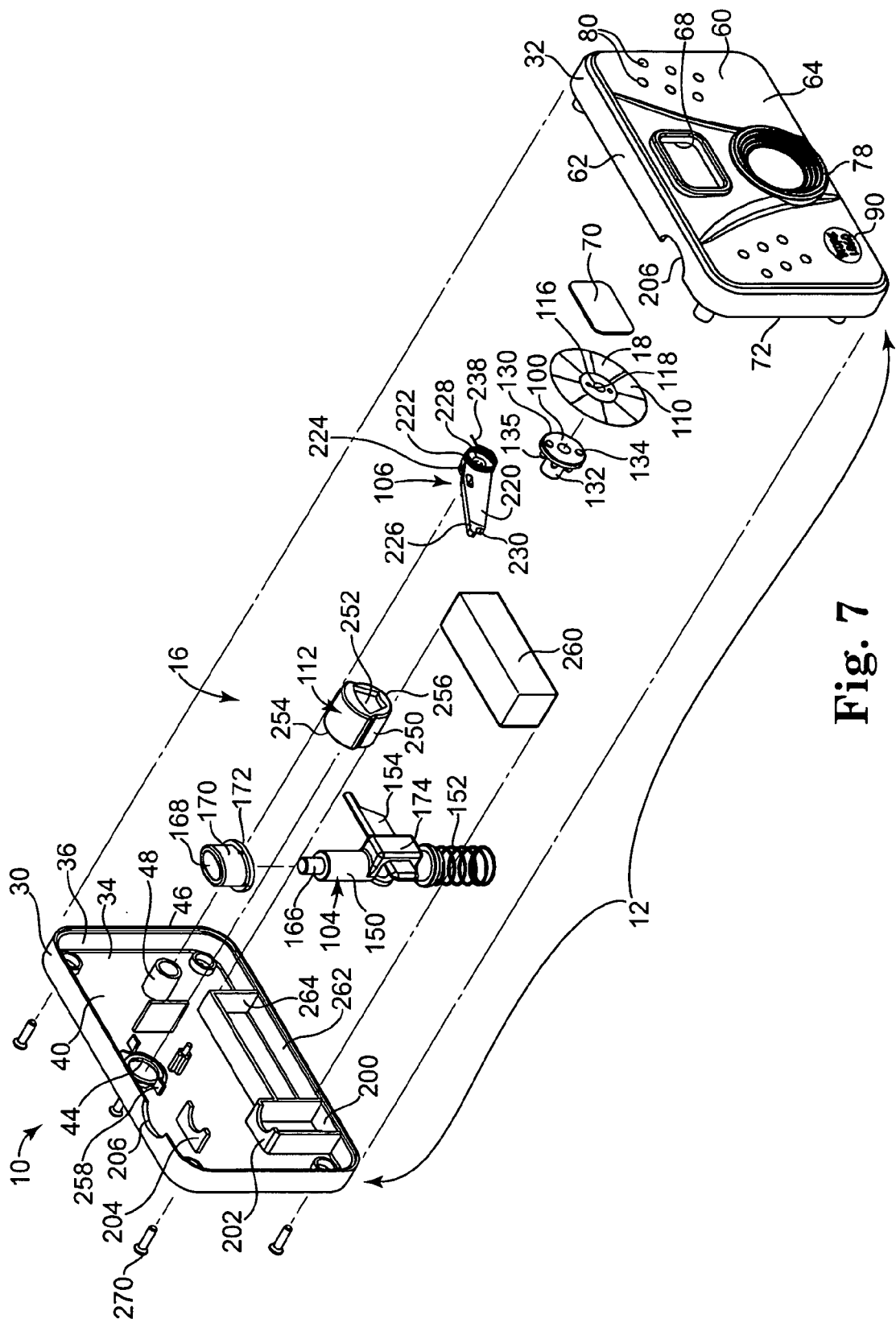
FIG. 7 is an exploded, perspective view illustrating the transaction product of FIG. 1, according to one embodiment of the present invention.

Turning to the figures, FIGS. 1-6 illustrate various view of an assembled transaction product 10 (e.g., a stored-value card or financial transaction card) according to one embodiment of the present invention. FIG. 7 illustrates an exploded, perspective view of transaction product 10 illustrated in FIGS. 1-6. Referring to FIGS. 1-7, in one embodiment, transaction product 10 includes an enclosure or housing 12, an account identifier 14 (or other activation area), a slide viewing assembly 16 as generally illustrated, for example, in FIG. 7. In one example, slide viewing assembly 16 is at least substantially enclosed within housing 12 and is configured to allow a bearer of transaction product 10 to selectively view varying portions of a slide 18 of slide viewing assembly 16 in a manner educating and/or amusing the bearer.

Account identifier 14 identifies or otherwise links transaction product 10 with an account or record and provides means for accessing the monetary funds or non-monetary funds (e.g., prepaid calling minutes or points) associated with the account or record for paying for goods and/or services, for use toward calling minutes, for use of points toward a purchase, etc. Referring to the rear view of FIG. 3, housing 12 includes account identifier 14 coupled thereto (e.g., securely coupled thereto) and indicating an account or record linked with transaction product 10. Account identifier 14 indicates an account or record to which transaction product 10 is linked. The account or record maintains a monetary or non-monetary value or balance associated with transaction product 10 and is optionally stored on a database, other electronic or manual record-keeping system or in the case of "smart" cards, for example, on a chip or other electronic device on transaction product 10 itself. Accordingly, by scanning or otherwise reading account identifier 14, the account or record linked to transaction product 10 is identified and can subsequently be activated and have amounts debited and/or added to the value associated therewith.

In one embodiment, account identifier 14 includes one or more of a bar code, magnetic strip, smart chip or other electronic device, radio frequency identification (RFID) device or other suitable marking readily readable by a point-of-sale terminal, account access station, kiosk or other suitable machine or device. In one embodiment, account identifier 14 is coupled to (e.g., printed or adhered to), enclosed within or otherwise fixedly connected to housing 12. In one embodiment, account identifier 14 includes a printed character string or code 20 (e.g., a number and/or letter string) configured to provide additional security to the use of transaction product 10 and/or configured to be read by a bearer of transaction product 10 to facilitate use of transaction product 10 for web site or other purchases outside of brick-and-mortar type retail establishments. With the above in mind, account identifier 14 is one example of means for linking transaction product 10 with an account or record, and scanning of account identifier 14 is one example of means for activating or loading value on transaction product 10 or at least a portion of such means.

In one embodiment, housing 12 includes a first housing member 30 and a second housing member 32 where, for example, first housing member 30 serves as a base, and second housing member 32 serves as a cover. Base 30 and cover 32 are configured to be coupled to one another and to at least partially house slide viewing assembly 16 therebetween.

In one embodiment, base 30 generally includes a primary panel 34 and a side wall 36. In one example, primary panel 34 is generally rectangular in shape and is sized similar to that of an identification card, a credit card or other wallet-sized card. In particular, in one embodiment, primary panel is about 8.5 cm long and about 5.4 cm wide. In one example, the corners of primary panel 34 and side wall 36 are rounded or chamfered. In other embodiments, primary panel 34 is otherwise shaped as a square, circle, oval, star or any other suitable shape. Primary panel 34 defines a first or inside surface 40 (FIG. 7) and a second or outside generally planar surface 42 opposite inside surface 40. In one example, an aperture 44 extends through primary panel 34 (i.e., from inside surface 40 to outside surface 42). Aperture 44 is configured to permit viewing of at least a portion of slide 18 as will be further described below.

Figure 1:
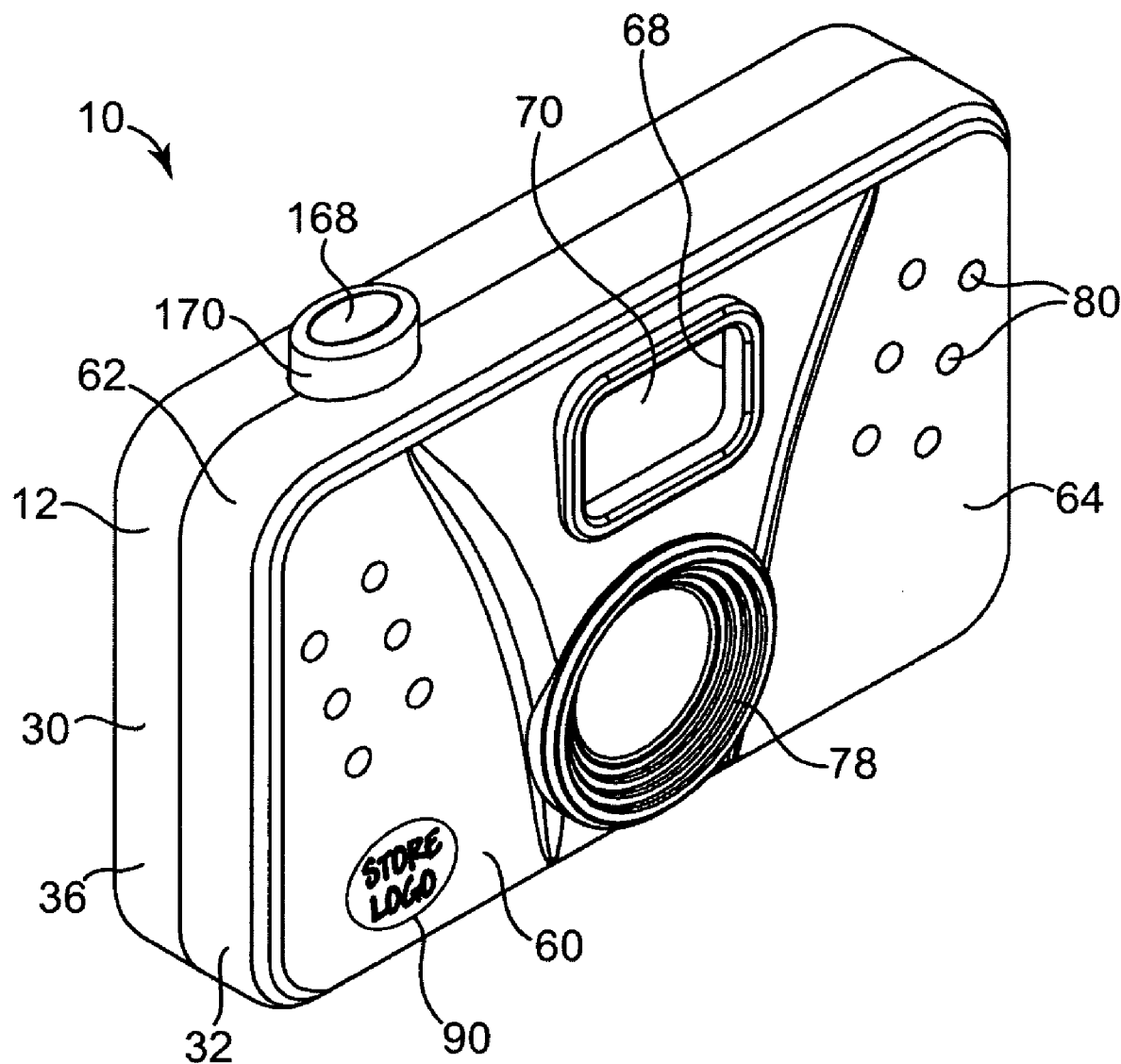
FIG. 1 is a perspective view illustrating a transaction product, according to one embodiment of the present invention.
Figure 2:
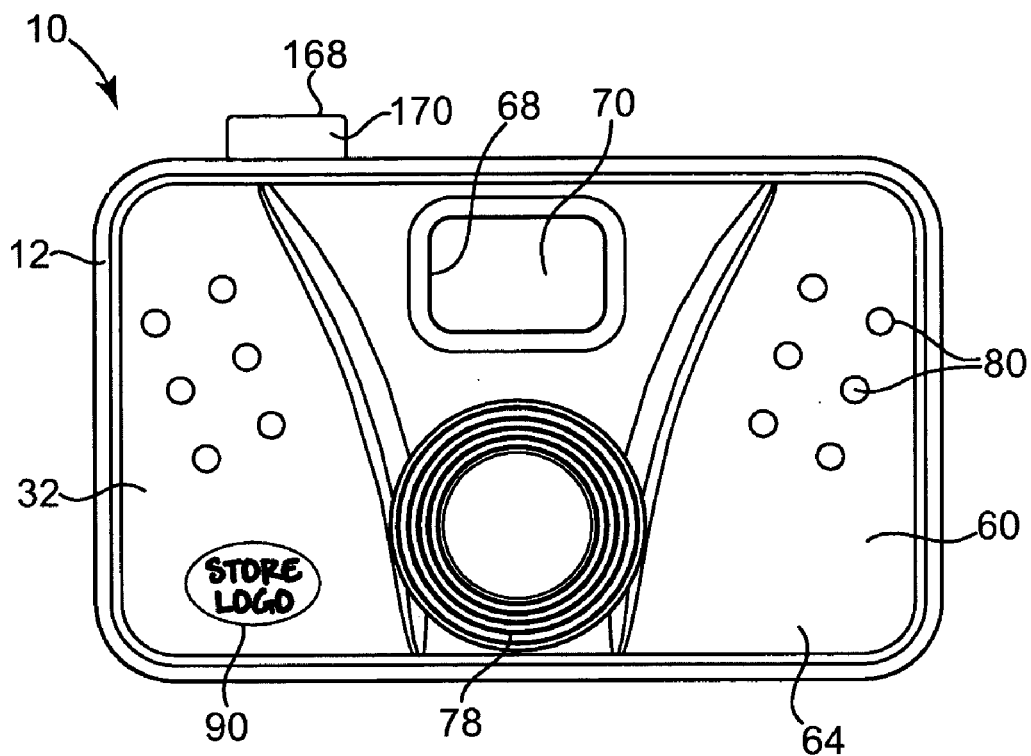
FIG. 2 is a front view illustrating the transaction product of FIG. 1, according to one embodiment of the present invention.
Figure 3:
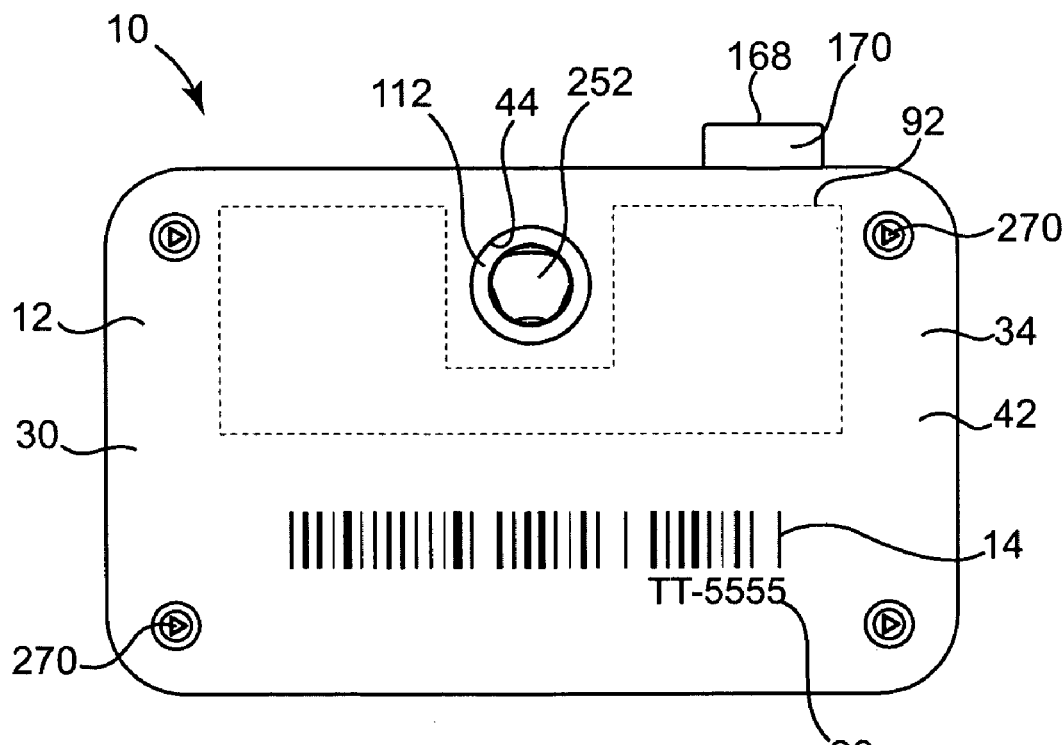
FIG. 3 is a rear view illustrating the transaction product of FIG. 1, according to one embodiment of the present invention.
Figure 4:
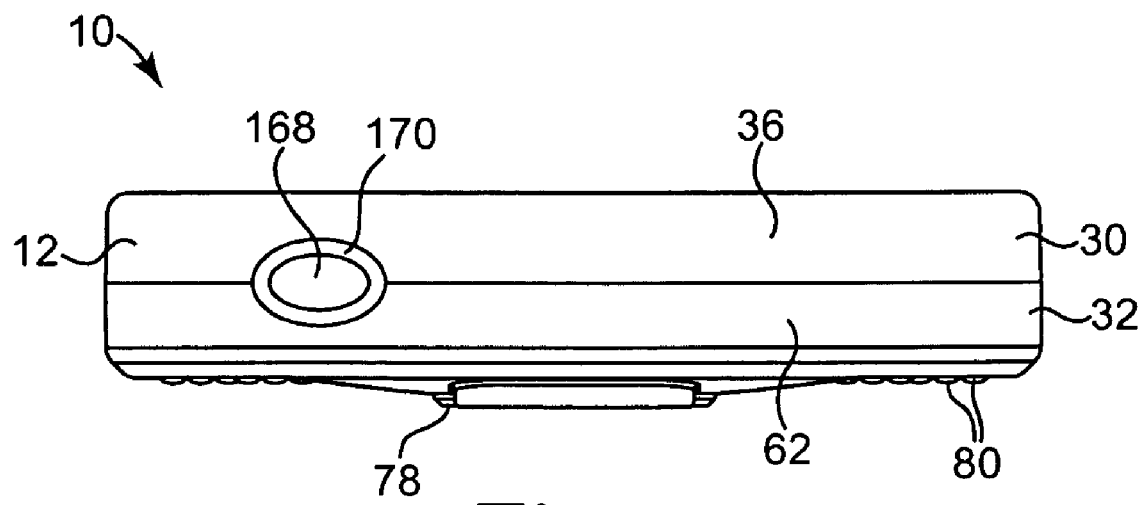
FIG. 4 is a top view illustrating the transaction product of FIG. 1, according to one embodiment of the present invention.
Figure 5:
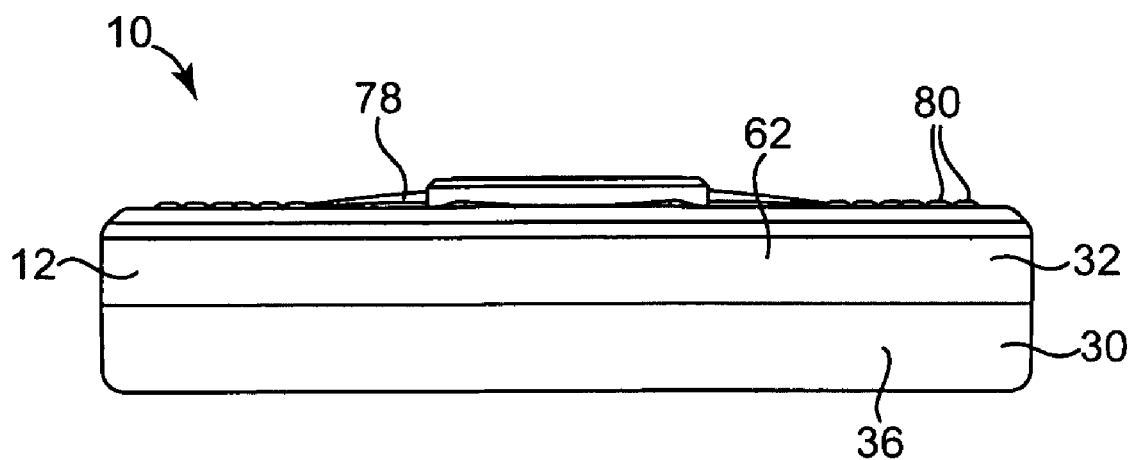
FIG. 5 is a bottom view illustrating the transaction product of FIG. 1, according to one embodiment of the present invention.
Figure 6:
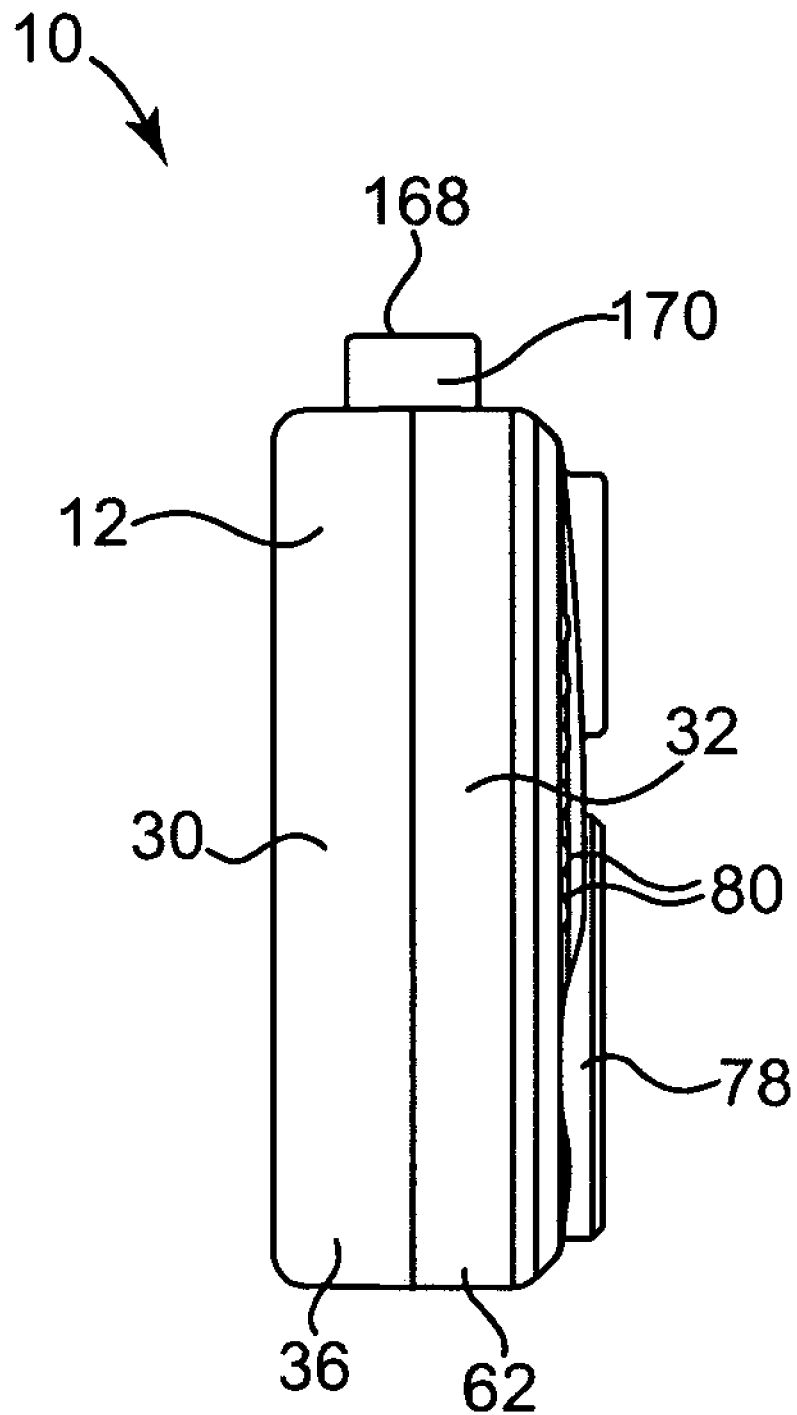
FIG. 6 is a left side view illustrating the transaction product of FIG. 1, according to one embodiment of the present invention, the right side view being a mirror image of the left side view.

Additionally referring to FIG. 7, side wall 36 generally extends from inside surface 40 of primary panel 34 generally about the entire perimeter of primary panel 34 in a direction away from outside surface 42 (e.g., FIG. 3). In one example, side wall 36 extends from primary panel 34 with a generally perpendicular orientation. Accordingly, as illustrated in FIG. 7, side wall 36 defines an edge 46, for example, a stepped edge, opposite primary panel 24.

In one example, various protrusions 48 extend from inside surface 40 of primary panel 34 and/or from side wall 36 in a similar direction as side wall 36. Each protrusion 48 is configured to facilitate positioning and coupling of base 30 with cover 32 as will be further described below. Other internal members for registering and/or aligning various components within housing 12 as will be further described below.

Figure 8:
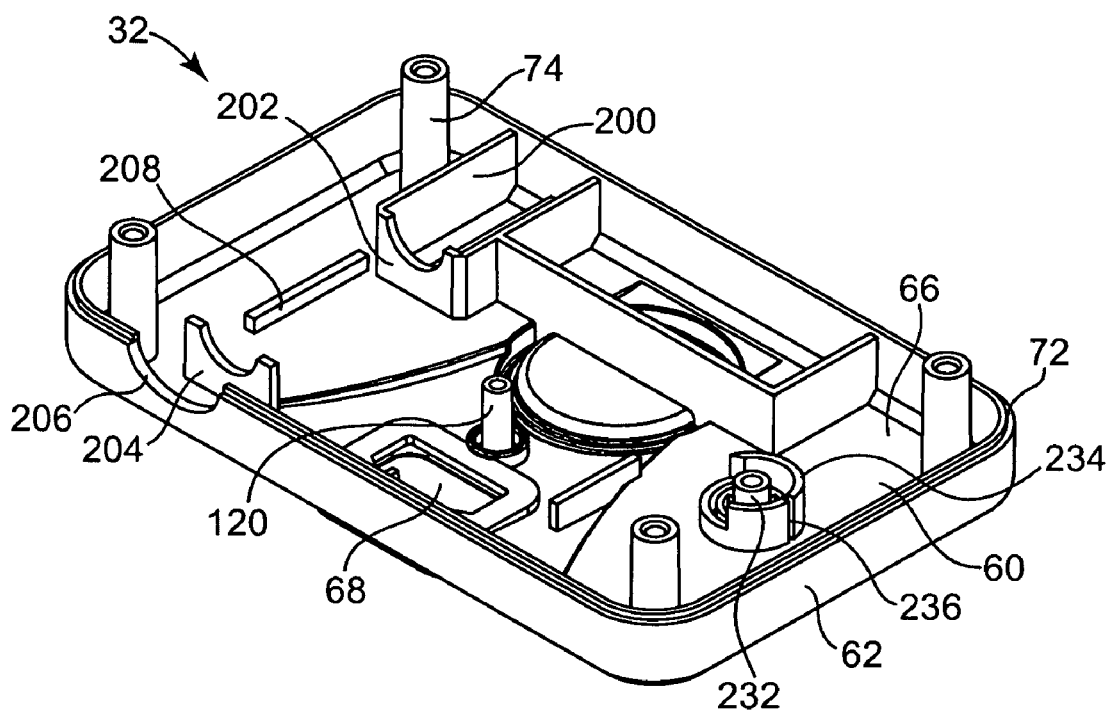
FIG. 8 is a perspective view illustrating an inside of a cover of the transaction product of FIG. 7, according to one embodiment of the present invention.

Cover 32 generally includes a primary panel 60 and a side wall 62. Primary panel 60 is generally planar and defines an outside surface 64 and an inside surface 66 (FIGS. 8, 11 and 12) opposite outside surface 64 (e.g., FIG. 1). In one embodiment, primary panel 60 is of an overall size and shape generally similar to primary panel 34 of base 30. Referring, for example, to FIG. 7, primary panel includes an opening or aperture 68 configured to permit a bearer to view portions of slide 18 maintained within housing 12 and/or to permit light to enter housing 12 to facilitate viewing of portions of slide 18 as will be further described below. In one embodiment, a window 70 or other substantially transparent (e.g., transparent or translucent) member extends over aperture 68.

In one example, side wall 62 extends from inside surface 66 of primary panel 60 away from outside surface 64 and generally about the entire perimeter of primary panel 60. More specifically, in one example, side wall 62 extends with a generally perpendicular orientation relative to primary panel 60. As such, side wall 62 extends from primary panel 60 to form an edge 72 opposite primary panel 60, for example, a stepped edge. Edge 72 is configured to interface and be coupled with edge 46 of base 30 when base 30 is coupled with cover 32. In one embodiment, friction or snap fit, adhesive, ultrasonic welding, and/or any other suitable technique may be used to couple base 30 to cover 32.

In one example, one or more protrusions 74 extend from primary panel 60 into cover 32. When base 30 and cover 32 are coupled to one another, one or more protrusion 74 aligns with and/or is received by one of protrusions 48 of base 30 (FIG. 7) to facilitate alignment and coupling of base 30 and cover 32.

In one embodiment, base 30 and cover 32 are each formed of a paper material, card stock material, plastic material, etc. or composite thereof. In one example, each of base 30 and cover 32 are formed of by injection molding or otherwise forming plastic (e.g., polycarbonate, polystyrene, polyvinyl chloride (PVC), acrylonitrile butadiene styrene (ABS), polyethylene terephthalate (PET), teslin, polyactide (PLA) and acrylic) or other suitable material to define the various attributes of housing 12. Other materials and methods of forming base 30 and cover 32 are also contemplated. In one example, housing 12 (e.g., base 30 and/or cover 32) includes exterior features 78 configured to enhance the visual appearance of a camera or similar item corresponding to scenes depicted by slide 18 or the general nature of transaction product 10.

In one embodiment, housing 12, for example, cover 32, includes grip-enhancing features 80 on one or both outside surface 42 and/or 64 thereof. In one example, each grip-enhancing feature 80 is provided in the form of ridges, raised partially spherical bumps and/or other features formed on housing 12. In one example, as illustrated in FIGS. 1-7, grip-enhancing features 80 provide a contoured surface to aid a user in gripping transaction product 10. In one embodiment, grip-enhancing features 80 are integrally formed with one or more of base 30 and cover 32.

Base 30 and/or cover 32 may additionally include other internal protrusions or inner walls extending from a respective one of primary panels 34 and 60 toward an inside of housing 12. Such walls or protrusions facilitate placement and alignment of slide viewing assembly 16 components relative to housing 12, examples of which will be further described below.

In one example, housing 12 includes one or more of brand indicia 90 and redemption indicia, which are generally indicated by a dashed box at 92 in FIG. 3. Indicia 90 and 92 may be applied to housing 12 in any suitable manner such as with printing, with a printed label, via integral formation with housing 12, etc.

Brand indicia 90 identify a brand associated with transaction product 10 such as identifying a product brand, a store brand or other indicia readily associated with a product or store etc. In one embodiment, brand indicia 90 are included on one or both of primary panel 34 and primary panel 60.

In one embodiment, housing 12 includes redemption indicia 92, which, in one example, are included on outside surface 64 of primary panel 60. Redemption indicia 92 indicate that transaction product 10 is redeemable for the purchase of goods and/or services and that, upon use, a value of the goods and/or services will be deducted from the account or record linked to transaction product 10. In one embodiment, redemption indicia 92 include phrases such as "<NAME OF STORE> GiftCard" and "This GiftCard is redeemable for merchandise or services at any of our stores or at our web site," and/or provides help or phone line information in case of a lost, stolen or damaged transaction product, etc.

Figure 9:
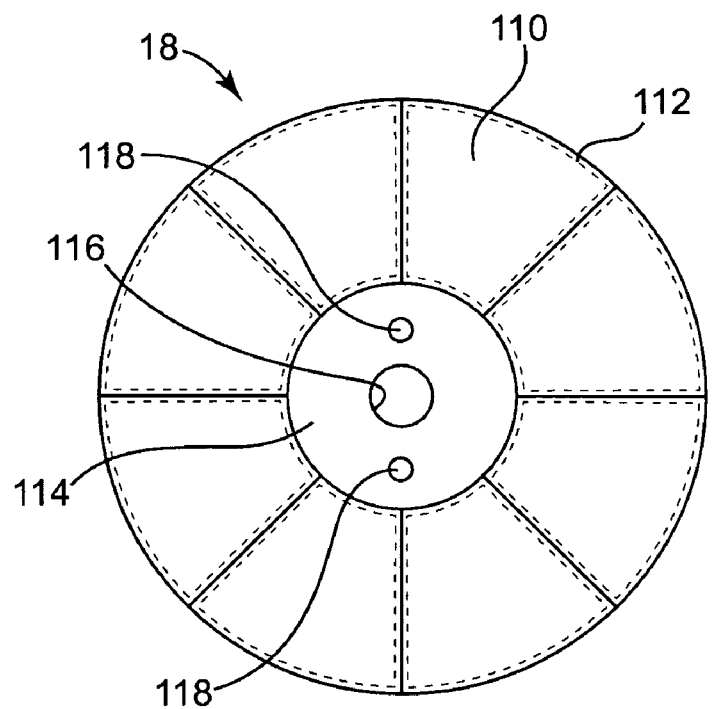
FIG. 9 is a front view of a slide of the transaction product of FIG. 7, according to one embodiment of the present invention.
Figure 11:
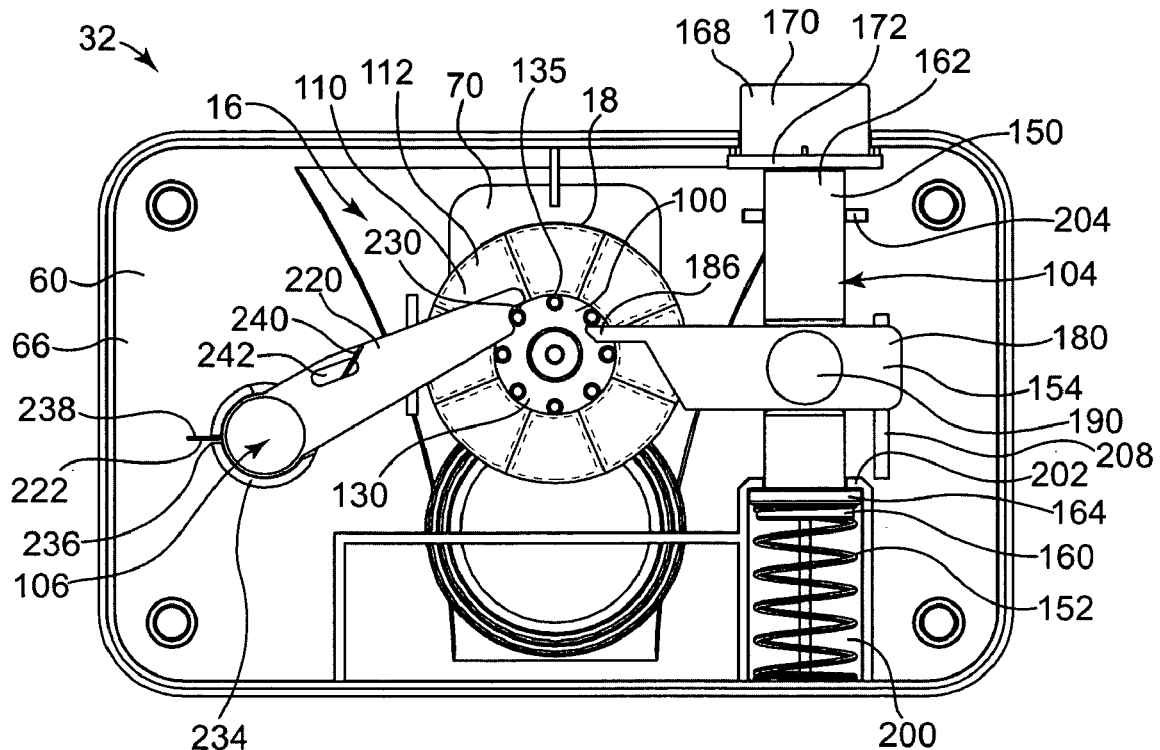
FIG. 11 is a rear view illustrating a portion of the transaction product including a cover, a slide, a hub, an actuating mechanism and a stop mechanism of the transaction product of FIG. 7 in a reference state, according to one embodiment of the present invention.
Figure 12:
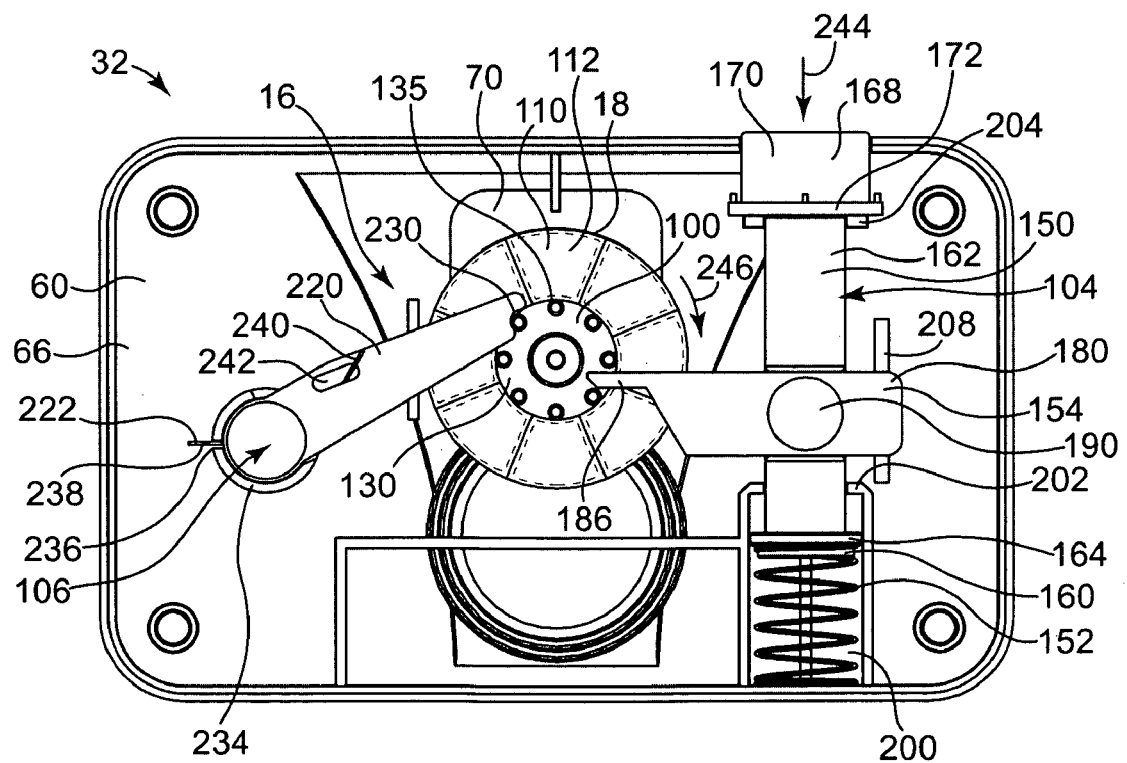
FIG. 12 is a rear view illustrating the portion of the transaction product of FIG. 11 in an actuated state, according to one embodiment of the present invention.

Referring to the exploded, perspective view illustration of FIG. 7 as well as FIGS. 11 and 12, in one embodiment, slide viewing assembly 16 generally includes slide 18, a hub 100, a lens assembly 102, an actuating mechanism 104 and/or a stop mechanism 106. Additionally referring to FIG. 9, slide 18 includes a plurality of portions 110, each portion 110 depicting a scene 112 as generally indicated in dashed lines in FIG. 9. Each depicted scene 112 is distinct from at least corresponding scene 112 of any adjacent portion 110 of slide 18. In one embodiment, hub 100 is coupled with slide 18 and interacts with actuating mechanism 104 and stop mechanism 106 such that actuating mechanism 104 and stop mechanism 106 are configured to control selective advancing and positioning of slide 18 within housing 12.

In one embodiment, slide 18 is formed from any suitable substantially transparent film such as clear acetate. Scenes 112 are printed thereto in any suitable manner as will be apparent to those of skill in the art upon reading this application. In particular, scenes 112 are printed to allow viewing through the acetate or other material when back lit (i.e., are lit from a side of slide 18 opposite that from which slide 18 is being viewed). In one embodiment, each of the scenes 112 has different subject matter, such that all scenes 112 differ from one another (e.g., no two scenes 112 are merely different views of the same general depiction or subject matter). In one example, where slide 18 is circular, scenes 112 are circumferentially spaced around the slide and, in one embodiment, are positioned immediately adjacent one another.

In one example, slides 18 are printed one on or both surfaces thereof in a manner creating stereoscopic or three-dimensional imaging or to simulate stereoscopic or three-dimensional imaging. Notably, throughout this specification, the terms "stereoscopic imaging" and "three-dimensional imaging" are used interchangeably in a manner encompassing any imaging considered to be three dimensional and/or stereoscopic. In one example, two scenes 112 depict the same general subject matter but from slightly different perspectives or viewing locations. In one embodiment, scenes 112 are non-stereoscopic. Although primarily described herein as being a single slide 18, in one example, two or more slides 18 are used to provide additional scenes 112 or to further enhance stereoscopic viewing of scenes 112 printed thereon as will be apparent to those of skill in the art upon reading this application.

In one embodiment, slide 18 is a circular disk and, more specifically, includes a center portion 114 circumferentially extending about and adjacent to a center of slide 18. Portions 110 of slide are defined and spaced evenly about the circumference of slide 18 nearer an outer perimeter of slide 18 than center portion 114. In one example, center portion 114 defines a center aperture 116 and one or more coupling apertures 118 configured to facilitate coupling of slide 18 within housing 12 and to hub 100 as will be further described below. For instance, in one embodiment, center aperture 116 extends around a shaft 120 of cover 32 (more specifically, extending perpendicularly from inside surface 66 of primary panel 60) while coupling apertures 118 receive corresponding features of hub 100. In one example, slide 18 and hub 100 collectively define a disk assembly.

Referring to FIGS. 7, 11 and 12, in one example, hub 100 includes a plate 130, a hollow cylinder 132, protrusions 134 and pegs 135. Plate 130 is a substantially planar member and, in one embodiment, is substantially circular. In one embodiment, plate 130 is sized similarly to center portion 114 of slide 18. Hollow cylinder 132 extends from a surface of plate 130 and is coaxially positioned with respect to plate 130 (e.g., extends from and around a center of plate 130). The center hollow cylinder 132 extends through plate 130 such that an internal cavity extending through hollow cylinder 132 is accessible from an opposite surface of plate 130. In one embodiment, hub 100 is configured such that shaft 120 of housing 12 extends through plate 130 and into hollow cylinder 132 in a manner allowing hub 100 to rotate about shaft 120.

Protrusions 134 extend from the opposite surface of plate 130 and are positioned to receive coupling apertures 118 of slide 18 to coupled slide 18 to hub 100. In one embodiment, pegs 135 extend from the same surface of plate 130 as hollow cylinder 132 and are equally and circumferentially spaced around plate 130 near an outer perimeter thereof. The number of pegs 135 generally is equal to a number of scenes 112 depicted by slide 18. For instance, in one example, slide 18 includes eight scenes 112, and eight pegs 135 are included on hub 100.

In one embodiment, lens assembly 102 includes a collar 250 surrounding a lens 252. Lens 252 is any suitable lens configured to facilitate viewing scenes 112 from slide 18 as will be apparent to those of skill in the art upon reading this application. Lens 252 is a magnifying lens such that when scenes 112 are viewed through lens 252 they appear substantially larger than they are printed to slide 18. For example, in one embodiment, lens 252 magnifies scenes 112 by between about two to about ten times their actual size. Lens 252 may have other desirable properties to facilitate the stereoscopic or simulated stereoscopic presentation of scenes 112.

Lens 252 is positioned within housing 12 to align with apertures 44 and 68 of housing 12. More specifically, lens 252 is positioned between aperture 44 of base 30 and slide 18 such that when a bearer of transaction product 10 looks through aperture 44 they look through lens assembly 102 to slide 18. In this manner, a first end 254 of collar is positioned near slide 18 and a second end 256 of collar 250 is positioned adjacent primary panel 34 of base 30 such that lens assembly 102 substantially covers aperture 44. In one embodiment, base 30 or other portions of housing 12 define internal registration features 258 to facilitate positioning and coupling of lens assembly 102 within housing 12.

Figure 10:
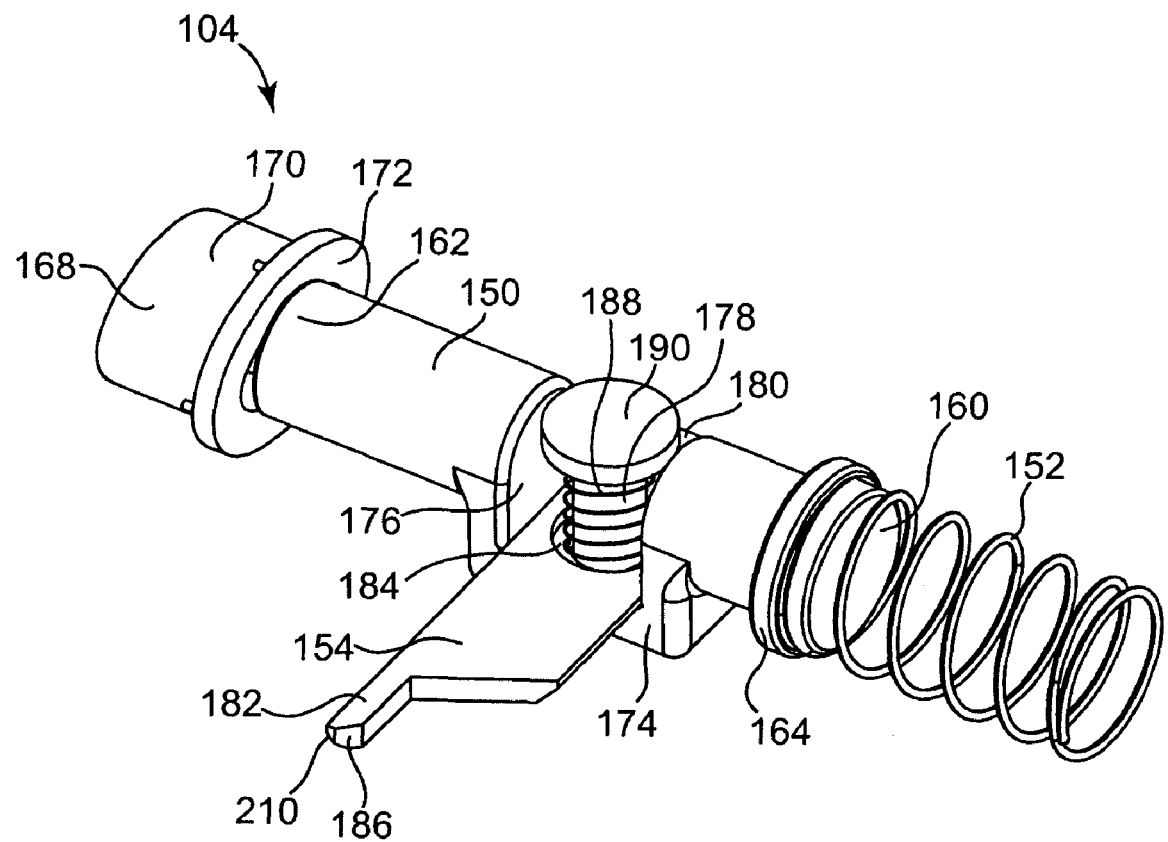
FIG. 10 is a perspective view illustrating an actuating mechanism of the transaction product of FIG. 7, according to one embodiment of the present invention.

Additionally referring to FIG. 10, in one embodiment, actuating mechanism 104 includes an elongated body 150, a reset spring 152 or other biasing member, an actuating cam member 154, and a switch or user interface member such as a button 168. Elongated body 150 defines a first end 160 and a second end 162 opposite first end 160. A rim 164 extends around elongated body 150 near first end 160, and a post 166 is formed at second end 162 extending in a direction away from first end 160. Reset spring 152 is attached to first end of elongated body 150 just below rim 164 (i.e., on an opposite side of rim 164 than second end 162) to provide a biasing or reset force to actuating mechanism 104 toward a reference or initial state (see FIG. 11) as will be further described below. In one example, where reset spring 152 is a coil spring, a portion of reset spring 152 coils around second end 162 of elongated body 150 to facilitate attachment thereto.

Button 168 is coupled to elongated body 150 via post 166. More specifically, in one embodiment, button 168 defines a cap 170 with a flange 172 extending about and radially outwardly from an open end of cap 170. Button 168 is placed such that post 166 of elongated body 150 is received by cap 170. Button 168 provides an interface for the bearer of transaction product 10 to interact with actuating mechanism 104.

In one embodiment, other than rim 164 and post 166, elongated body 150 is substantially cylindrical except for an offset portion 174 positioned between first end 160 and second end 162. Offset portion 174 extends away from a remainder of elongated body 150 in a direction substantially perpendicular to the central axis of elongated body 150 (i.e., an extension of elongated body 150 between first end 160 and second end 162) to define an opening 176 along a length of elongated body 150. In one example, elongated body 150 defines an elongated pin 178 extending from offset portion 174 within opening 176 in a direction substantially perpendicular to the central axis of elongated body 150. Pin 178 is configured to facilitate coupling of cam member 154 with elongated body 150.

Cam member 154 defines a first end 180 and a second end 182, which is opposite first end 180. In one embodiment, an aperture 184 is defined through cam member 154 and is positioned between first end 180 and second end 182, for example, nearer first end 180 than second end 182. Aperture 184 is sized just larger than outer dimensions of pin 178 such that cam member 154 slides over pin 178 positioning pin 178 to extend through aperture 184. In one example, opening 176 of elongated body 150 is defined just larger than a width of cam member 154 to generally prevent or at least substantially decrease rotation of cam member 154 about pin 178.

Cam member 154 extends away from pin 178 to define a finger 186 at second end 182. Finger 186 is substantially narrower than a remainder of cam member 154 and is sized to fit between adjacent pegs 135 of hub 100. In one embodiment, finger 186 defines an inclined surface 210 configured to serve as a ramp interacting with pegs 135 as will be further described below.

In one embodiment, a registration spring 188 (e.g., a coil spring) or other biasing member is placed around pin 178 after positioning of cam member 154 around pin 178. A cap 190 is placed on pin 178 and radially extends outwardly therefrom such that registration spring 188 is maintained between cam member 154 and cap 190. In this manner, registration spring 188 biases cam member 154 to stay positioned adjacent offset portion 174 of elongated body 150. In one example, cap 190 is eliminated if other features of housing 12 and/or actuating mechanism 104 sufficiently restrain movement of registration spring 188 to provide the biasing force to cam member 154.

In one embodiment, housing 12 includes specific features configured to receive actuating mechanism 104 and maintain actuating mechanism 104 in a position relative to slide 18 and hub 100 as illustrated with reference to FIGS. 7, 8, 11 and 12. More specifically, in one example, an elongated enclosed cavity 200 is defined within housing 12, for instance, partially by each of base 30 and cover 32. In one embodiment, cavity 200 extends from side walls 36 and 62 to define a stop wall 202 opposite side walls 36 and 62 within housing 12. Cavity 200 is sized to receive reset spring 152 and first end 160 of elongated body 150. More specifically, stop wall 202 includes a hole to allow elongated body 150 to extend out of cavity 200. However, the hole of stop wall 202 is sized such that rim 164 of elongated body 150 does not fit therethrough such that rim 164 and any portions of elongated body 150 below are constantly maintained within cavity 200 even where other portions of elongated body 150 selectively translate in and out of cavity 200 as will be further described below.

In one example, housing 12 defines additional internal features such as a collar 204 and a rail 208 to maintain elongated body 150 in a position generally extending parallel to primary panels 34 and 60 of housing 12. In one embodiment, one of side walls 36 and 62 or side walls 36 and 62 collectively define a cutout 206 opposite cavity 200. Cutout is sized to allow cap 170 of button 168 to extend out of housing 12 while maintaining flange 172 of button 168 within housing 12. In one example, collar 204 is also sized to interact with flange 172 of button 168 to stop or limit how far button 168 can be moved into housing 12.

Referring to FIGS. 7, 11 and 12, stop mechanism 106 includes a substantially planar cam member 220 and a registration spring 222 or other biasing member. Cam member 220 defines and extends between first end 224 and second end 226. An axel 228 extends from a surface of cam member 220 near first end 224 in a direction substantially perpendicular to a remainder of cam member 220. Cam member 220 defines a notch 230 near second end 226 and is sized to extend and fit around a portion of a single peg 135 of hub 100.

Spring 222, which, in one example, is a coil spring, is positioned to extend around axel 228. In one embodiment, a first end 238 of spring 222 extends radially outwardly away from axel 228 and a second end 240 of spring 222 is secured to cam member 220, for example, via an aperture 242 defined by cam member 22.

Housing 12 includes various features to facilitate positioning of stop mechanism 106 therein. For example, in one embodiment, housing 12, more specifically cover 32 as illustrated with additional reference to FIG. 8, defines a hollow post 232 with a protruding ring 234 extending around post 232. A registration slot 236 extends through a segment of protruding ring 234. Stop mechanism 106 is positioned within housing 12 such that axel 28 is received within (or, in other embodiments, to extend around) hollow post 232 and spring 222 extends around post 232 but within the confines of ring 234. First end 238 of spring 222 is secured to ring 234 by placement of first end 238 through registration slot 236. As such, first end 238 and second end 240 of spring 222 are secured to bias cam member 220 toward hub 100 as will be further described below.

When transaction product 10 is assembled, a portion of actuating mechanism 104 such as button 168 extends outside of housing 12 to be accessible to the bearer of transaction product 10. When a bearer of transaction product 10 presses or otherwise interacts with (e.g., slides) button 168, actuating mechanism 104 moves linearly within housing 12 and interfaces with hub 100 thereby causing hub 100 and slide 18, which is coupled thereto, to move. Movement of slide 18 changes which one of scenes 112 is positioned to be viewed through lens 252, and in one example, is aligned with window 70 for back lighting slide 18 with ambient light or with a distinct light source (not shown). Stop mechanism 106 also interacts with hub 100 to decrease or substantially prevent undesired movement of hub 100 and slide 18. Example placements and interactions of the components of transaction product 10 are further described below.

FIG. 11 illustrates slide viewing assembly 16 in cover 32 when slide viewing assembly 16 is in a neutral or reference position. FIG. 12 illustrates slide viewing assembly 16 in cover 32 during actuation of slide viewing assembly 16 (i.e., with slide viewing assembly 16 in an actuated position). As shown, slide 18 is placed in cover 32, more particularly, center aperture 116 of slide 18 is placed around shaft 120 of cover 32. In one embodiment, one portion 110 with corresponding scene 112 is positioned to align with lens assembly 102, more specifically, lens 252, and aperture 68 of cover 32. Hub 100 is then also placed on shaft 120 such that shaft 120 extends through plate 130 and into hollow cylinder 132 of hub 100. Both slide 18 and hub 100 are rotatable about shaft 120. In one embodiment, rear protrusions 134 of hub 100 are received within a corresponding coupling aperture 118 of slide 18 to couple hub 100 to slide 18

In one embodiment, actuating mechanism 104 is placed in housing 12 such that reset spring 152 is positioned in cavity 200, elongated body 150 extends from cavity 200, out an opening in stop wall 202 and across collar 204, and cap 170 of button 168 extends out of cutouts 206 in housing 12. When so placed, finger 186 of cam member 154 extends to fit between two pegs 135 of hub 100. When button 168 is pressed in the direction generally indicated by arrow 244 in FIG. 12, elongated body 150 linearly moves to compress reset spring 152. When moved linearly, finger 186 pushes against an adjacent peg 135 causing hub 100 and slide 18 to rotate as generally indicated by arrow 246 in FIG. 12 (e.g., in a clockwise direction) or to otherwise advance. In one example, advancement of slide 18 changes what portion 110 and scene 112 of slide 18 aligns with and is visible through lens 252 (FIG. 7) once lens assembly 102 (FIG. 7) is positioned relative to cover 32. In one embodiment, interaction between flange 172 of button 168 and collar 204 limits linear movement of button 168 into and a remainder of actuating mechanism 104 within housing 12. In view of the above, actuating mechanism 104 is one example of mans for receiving an actuating force and for using the force to induce movement of hub 100 and slide 18 (i.e., the disk assembly).

To facilitate consistent functioning of actuating mechanism 104 and predictable interaction with hub 100, other features may be utilized. For example, first end 180 of cam member 154 rides along rail 208 of cover 32. Rail 208 maintains first end 180 spaced from primary panel 60 of cover 32 a similar distance as second end 182 of cam member 154 to avoid undesirable rotation or movement of cam member 154 such that cam member 154 generally moves in a direction substantially parallel to primary panel 60.

When the force applied by the product bearer in the direction of arrow 244 is removed from button 168, reset spring 152 pushes actuating mechanism 104 in a direction opposite arrow 244 back to the reference or neutral position shown in FIG. 11. When moving back to the reference position, upon interaction with a peg 135, finger 186 interacts with and lifts away from (e.g., in a direction away from primary panel 60) and past that corresponding peg 135 to return to the reference position due at least in part to contact between the corresponding peg 135 and inclined surface 210 (FIG. 10) of finger 186. Once finger 186 is past the one peg 135, registration spring 188 pulls cam member 154 and, therefore, finger 186, back toward primary panel 60 into the reference position in and out of the page with respect to the orientation of FIGS. 11 and 12. In one embodiment, interaction between flange 172 of button 168 and side walls 36 and 62 and between rim 164 of elongated body 150 and stop wall 202 limits movement of actuating mechanism 104 back to reference state (i.e., not further out of housing 12).

To decrease movement of hub 100 and slide 18 back (e.g., in a counterclockwise direction as shown in FIGS. 11 and 12) upon movement of finger 186 back to the reference position, in one example, stop mechanism 106 interacts with hub 100. More specifically, during assembly, cam member 220 of stop mechanism 106 is coupled with housing 12 such that spring 222 is placed around hollow post 232 (FIG. 8) within ring 234 of housing 12. Cam member 220 is placed such that axel 228 of first end 224 is placed over or within hollow post 232 stop mechanism 106 in a manner allowing rotation of cam member 220 about axel 228 with respect to housing 12. In one example, spring first end 238 is secured relative to housing 12 by placing first end 238 through registration slot 236 in ring 234. In one embodiment, second end 240 is secured to cam member 220, more specifically, through aperture 242 of cam member 220. In this manner, cam member 220 is biased to a position in contact with at least one of pegs 135 of hub 100.

More specifically, in one embodiment, cam member 220 extends away from first axel 228 to define a notch 230 that receives or fits around a portion of one of pegs 135. The interaction between cam member 220 and one of pegs 135 substantially decreases or prevents counterclockwise movement of hub 100 and, therefore, slide 18. During actuation of slide viewing assembly 16, movement of hub 100 in the direction of arrow 246 causes a corresponding peg 135 to push against cam member 220, which, in turn, causes cam member 220 to rotate counterclockwise away from hub 100 so as not to prevent advancement of hub 100 and slide 18 during actuation. Once the actuating force is removed, registration spring 222 moves cam member 220 back into interaction with hub 100, more specifically, into interaction with a different one of pegs 135. The interaction between hub 100 and cam member 220 decreases or substantially prevents undesired movement of slide 18 in a direction opposite the direction of advancement, for example, in a direction opposite that of arrow 246. As such, during periods between actuation, slide 18 positioned such that a single portion 110 or scene 112 of slide 18 aligns with lens 252 (FIG. 7) for viewing and window 70 for allowing backlighting.

Other components of transaction product 10 will be apparent to those of skill in the art upon reading the present application. For example, a weight 260 may be placed in housing 12, for instance, within weight cavity 262 of housing 12. Weight 260 increases the weight of transaction product 10 in a manner generally contributing to a more robust or substantive feel of transaction product 10 when held by a bearer thereof. When slide viewing assembly 16 and any other components are properly positioned, base 30 and cover 32 are secured to one another to substantially enclose all such components therein. In one embodiment, lens assembly 102 is coupled to base 30 in a manner aligning with aperture 44 prior to coupling base 30 to cover 32. More specifically, lens assembly 102 is positioned with respect to base 30 such that when base 30 and cover 32 are aligned for coupling, lens 252 aligns window 70 and at least a portion 110 of slide 18. Base 30 and cover 32 may be coupled to one another in any suitable manner such as ultrasonic welding, friction fit, screws 270 and/or other manners. In one example, base 30 and cover 32 are substantially permanently coupled to one another, such that base 30 and cover 32 are not easily uncoupled from one another without substantially damaging housing 12.

Figure 13:
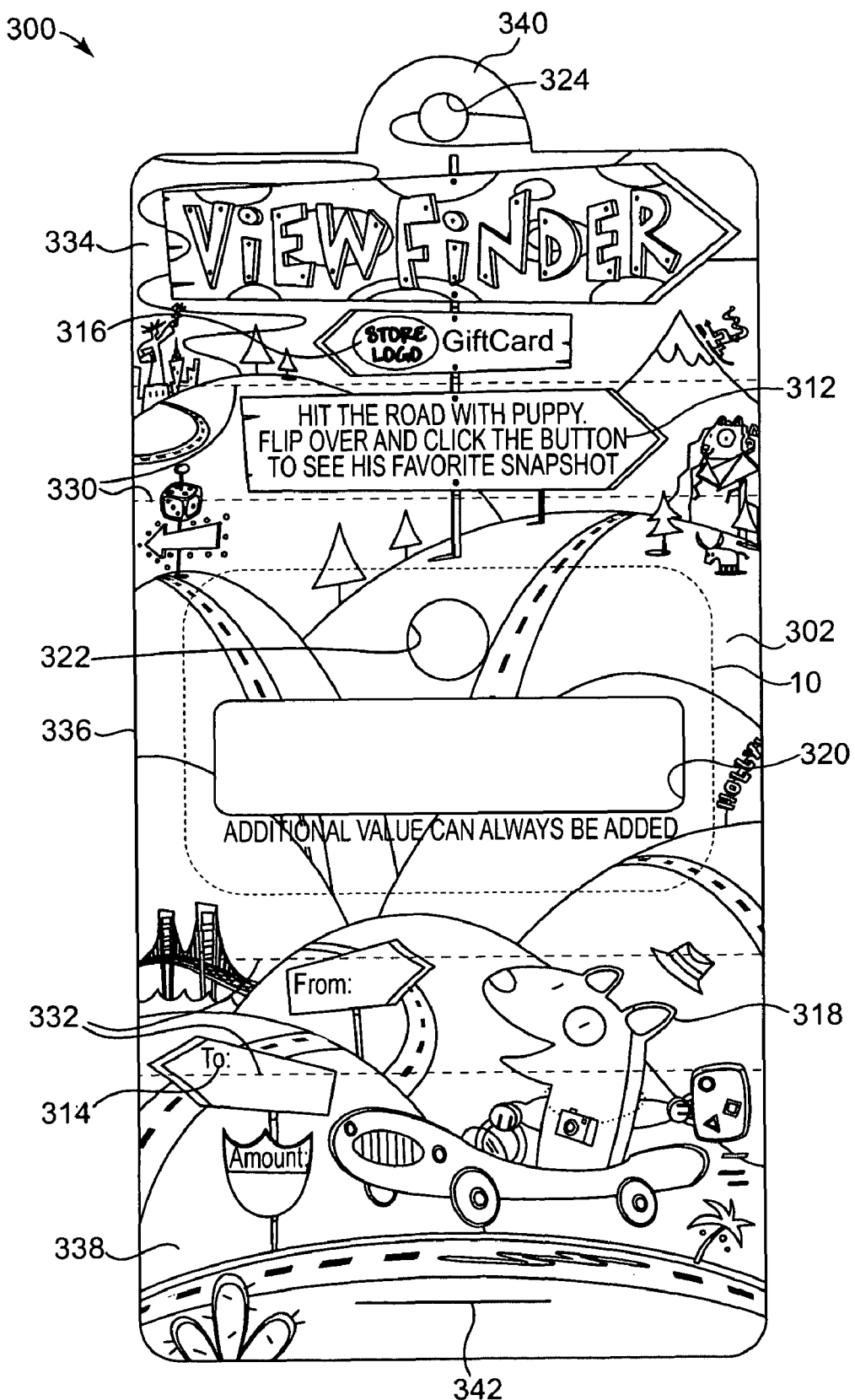
FIG. 13 is a front view of a backer for supporting a transaction product, according to one embodiment of the present invention
Figure 14:
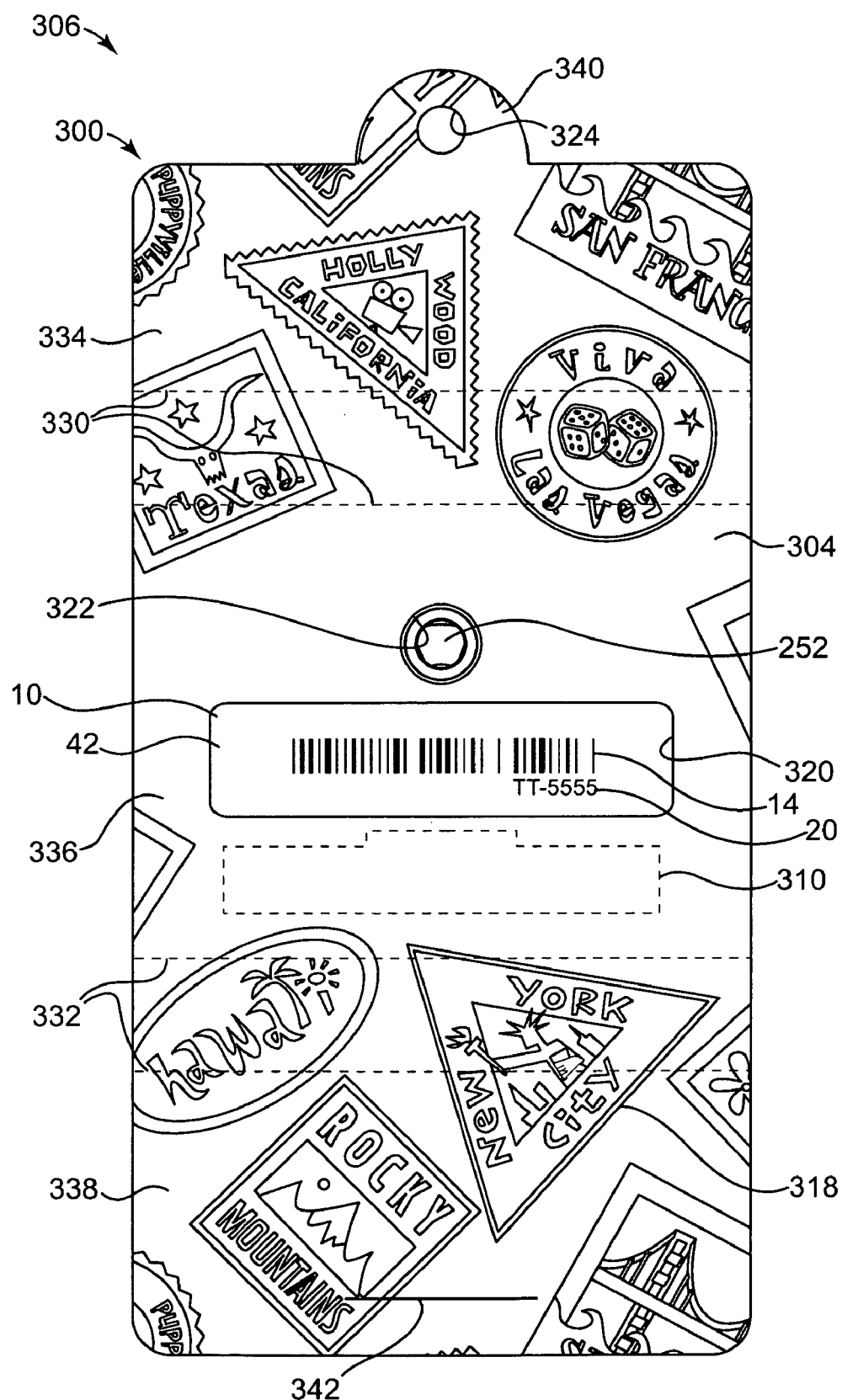
FIG. 14 is a rear view of a transaction product assembly including the backer of FIG. 13 and the transaction product of FIG. 1, according to one embodiment of the present invention.

FIGS. 13 and 14 illustrate a carrier or backer 300 supporting transaction product 10 (FIGS. 1-6). Backer 300 comprises a single layer or multiple layers of paper or plastic material, for example, generally in the form of a relatively stiff but bendable/flexible card. Use of other materials to form backer 300 is also contemplated. Backer 300 defines a first or front surface 302 (FIG. 13) and a second or rear surface 304 (FIG. 14). Transaction product 10, which is generally represented in broken lines in FIG. 13 for illustrative purposes (e.g., to allow for full viewing of front surface 302), is readily releasably attached to backer 300, for example, by adhesive, blister packaging, overlying skinning material, clam shell packaging or the like, such that transaction product 10 and backer 300 collectively define a transaction product assembly 306.

In one embodiment, backer 300 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front and rear surfaces 302 and 304. In one example, the indicia include one or more of redemption indicia 310, instructional indicia 312, message field indicia 314, brand indicia 316, decorative indicia 318, etc.

Redemption indicia 310, which are generally indicated with a dashed box in FIG. 13, indicate that transaction product 10 is redeemable for the purchase of goods and/or services and that upon use, a value of the purchased goods and/or services will be deducted from the account or record linked to transaction product 10. In one embodiment, redemption indicia 310 include phrases such as "<NAME OF STORE> Gift-Card" and "This GiftCard is redeemable for merchandise or services at any of our stores or at our website," and/or provides help or phone line information in case of a lost, stolen or damaged transaction product 10, etc.

Instructional indicia 312 include any indications generally referring to how transaction product 10 can be used for entertainment or functional purposes other than value redemption. For example, instructional indicia 312 indicate to the bearer that interacting with button 168 changes which one of the available snapshots or scenes 112 is positioned for viewing through transaction product 10. Other instructional indicia 312 on transaction product 10 and/or backer 300 are also contemplated.

Message field indicia 314, for example, including "to," "from" and "amount" fields, are configured to be written to by the bearer of transaction product assembly 306 prior to presenting transaction product assembly 306 to a recipient. As such, message field indicia 314 facilitate the consumer in preparing transaction product assembly 306 for gifting to a recipient. Brand indicia 316 identify a store, brand, department, etc. and/or services associated with transaction product 10.

Any suitable decorative indicia 318 may also be included on backer 300. In one embodiment, decorative indicia 318 are similar to or otherwise coordinate with distinct scenes 112 on slide 18 by way of a similar theme, similar characters or subjects, similar scenery, similar style of depiction, etc. Any of indicia 310, 312, 314, 316, 318 or other indicia optionally may appear anywhere on backer 300 or transaction product 10. Additional information besides that specifically described and illustrated herein may also be included.

In one embodiment, backer 300 defines a window or opening 320 for displaying account identifier 14 of transaction product 10 as illustrated in FIG. 14. As previously described, account identifier 14 is adapted for accessing an account or record associated with transaction product 10 for activating, loading or debiting value from the account or record. Accordingly, in one embodiment, opening 320 allows access to account identifier 14 to activate and/or load transaction product 10 without removing transaction product 10 from backer 300.

In one example, a use opening 322 is also formed through backer 300 and is positioned to align with lens assembly 102 of transaction product 10 when transaction product 10 is coupled to backer 300 for display in a retail setting. Use opening 322 permits a possible consumer, donor or recipient of transaction product 10 to try the slide viewing functionality of transaction product 10 before selecting transaction product assembly 306 for purchase, giving or receipt. More specifically, a current bearer of transaction product assembly 306 is able to look through use opening 322 and lens assembly 102 to view one or more scenes 112 of slide 18. Allowing the non-transactional functionality (i.e., the slide viewing functionality) of transaction product 10 to be tested by consumers prior to purchase through backer 300 promotes sale of transaction product 10 to potential consumers.

In one embodiment, backer 300 defines a hanging aperture 324 configured to receive a support arm or hook, such that transaction product assembly 306 can be hung from a rail or rack within the retail setting or elsewhere to facilitate display of transaction product assembly 306 for retail sale, etc. According to one embodiment, FIG. 14 illustrates surfaces of backer 300 that will be supported on a rack or other fixture while FIG. 13 illustrates surfaces of backer 300 that will be visible to a consumer of a retail store who is considering the purchase of transaction product assembly 306.

In one embodiment, backer 300 is configured to be folded about transaction product 10 to wrap transaction product 10 for presentation to a recipient. For example, in one embodiment, backer 300 includes fold lines 330 and 332, which extend substantially parallel to and are longitudinally spaced from one another to define a first panel 334, a second panel 336 and a third panel 338 of backer 300. For example, second panel 336 extends between first panel 334 and third panel 338. First panel 334 and second panel 336 are divided by fold lines 330, and second panel 336 and third panel 338 are divided by fold lines 332. In one embodiment, transaction product 10 is secured to second panel 336 such that, upon folding backer 300 about fold lines 330 and 332, first panel 334 and third panel 338 are folded relative to second panel 336 to at least partially overlap one another and to substantially enclose transaction product 10 within folded backer 300.

In one embodiment, backer 300 defines a tab 340 and a corresponding slit 342. More specifically, one of first panel 334 and third panel 338 defines one of tab 340 and slit 342, and the other of first panel 334 and third panel 338 defines the other of tab 340 and slit 342. In this configuration, when backer 300 is folded about fold lines 330 and 332, slit 342 receives tab 340 to selectively hold backer 300 in a folded or closed configuration. Other methods of folding backer 300 and/or maintaining backer 300 in a folded configuration will be apparent to those of skill in the art upon reading this application. In one embodiment, a non-foldable backer may be used as an alternative to or in addition to backer 300.

Figure 15:
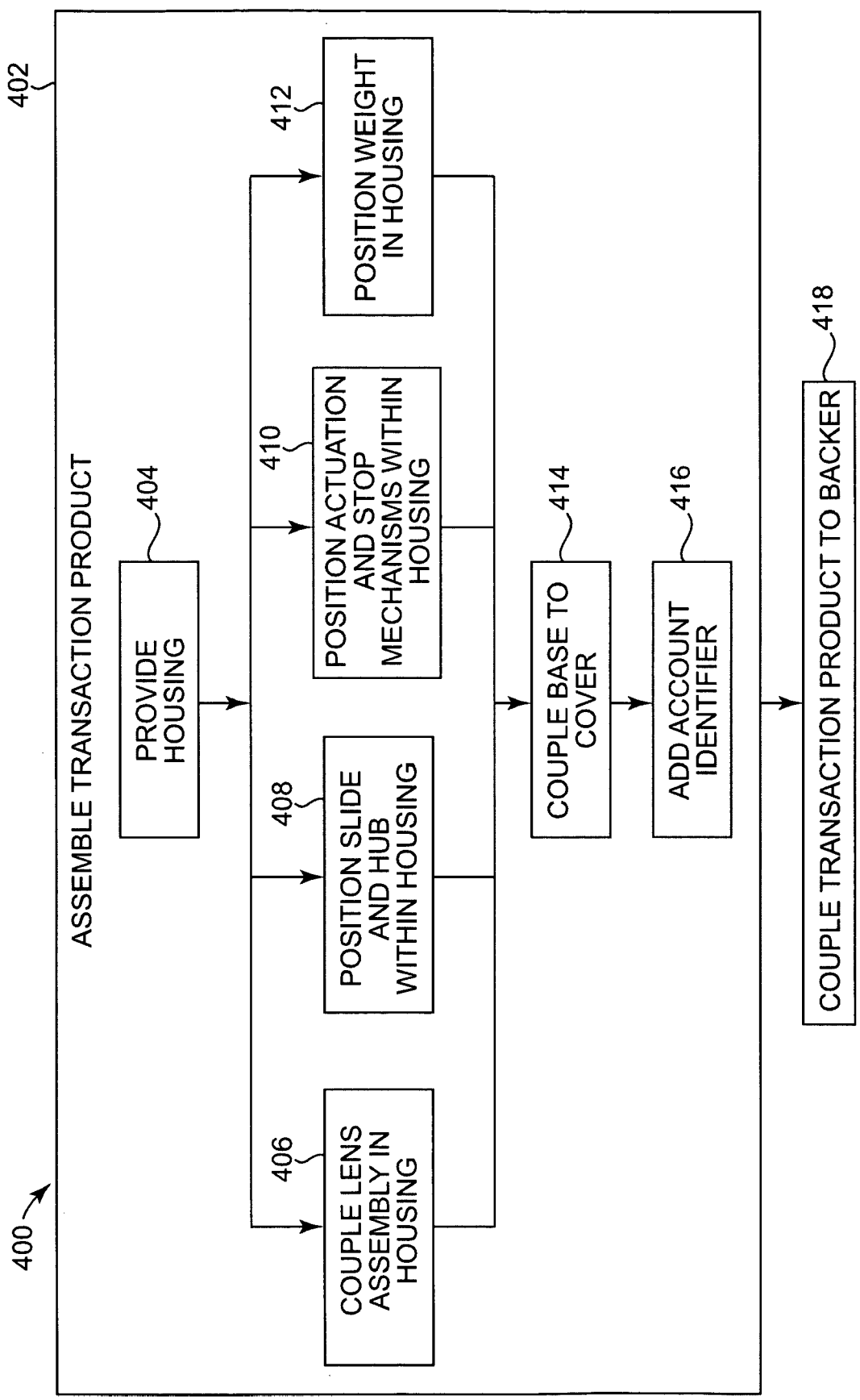
FIG. 15 is a flow chart illustrating a method of assembling the transaction product assembly of FIG. 14, according to one embodiment of the present invention.

FIG. 15 is a flow chart illustrating one embodiment of a method 400 of assembling transaction product assembly 306 as described with additional reference to FIGS. 1-8, 13 and 14. At 402, transaction product 10 is assembled. More specifically, at 404 housing 12 is provided. In one example, housing 12 is provided in the form of base 30 and cover 32. At 406, lens assembly 102 is positioned in housing 12 to immediately or eventually align with aperture 44 of base 30, window 70 and aperture 68 of cover 32. At 408, slide 18 and hub 100 are positioned within housing 12 to align one portion 110 of slide 18 with window 70 and aperture 68 and, therefore, to align with lens assembly 102. At 410, actuating mechanism 104 and/or stop mechanism 106 are positioned in housing 12 to each interact with hub 100 in a manner as described in detail above. In one example, weight 260 is placed in housing 12 at 412.

Once all desired components are placed in housing 12, at 414, housing 12 is closed around all such components. In one example, housing 12 is closed by securely coupling base 30 to cover 32 in any suitable manner. In one embodiment, once base 30 and cover 32 are secured to one another, all of slide viewing assembly 16 other than a portion of button 168 is fully enclosed within housing 12. Once assembled, lens assembly 102, aperture 44, one portion 110 of slide 18 and window 70 all linearly align with one another such that the bearer of transaction product 10 can substantially simultaneously look through aperture 44, lens 252 and the one portion 110 of slide 18 with light passing through window 70 to backlight slide 18 in a manner facilitating such viewing. In view of the above, housing 12 is one example of means for supporting and/or enclosing the components of slide viewing assembly 16.

In one embodiment, at 416, account identifier 14 is added to transaction product 10 in cases where account identifier 14 was not otherwise formed to, added to or positioned within base 30 and/or cover 32 at a previous step. For example, at 416, account identifier 14 may be printed or otherwise applied to one or both of primary panel 34 and primary panel 60 after coupling base 30 to cover 32 at 414. In one embodiment, account identifier 14 is added to transaction product 10 before one or more of operations 404, 406, 408, 410, 412 and 414.

In one example, following assembly of transaction product 10 at 402, then at 418, transaction product 10 is coupled to backer 300 to form transaction product assembly 306. In this manner transaction product 10 is configured for display in a retail store or on a retail web site, purchase, etc. Other methods of assembling transaction product 10 and/or transaction product assembly 306 as a whole are also contemplated and will be apparent to those of skill in the art upon reading the present application.

Figure 16:
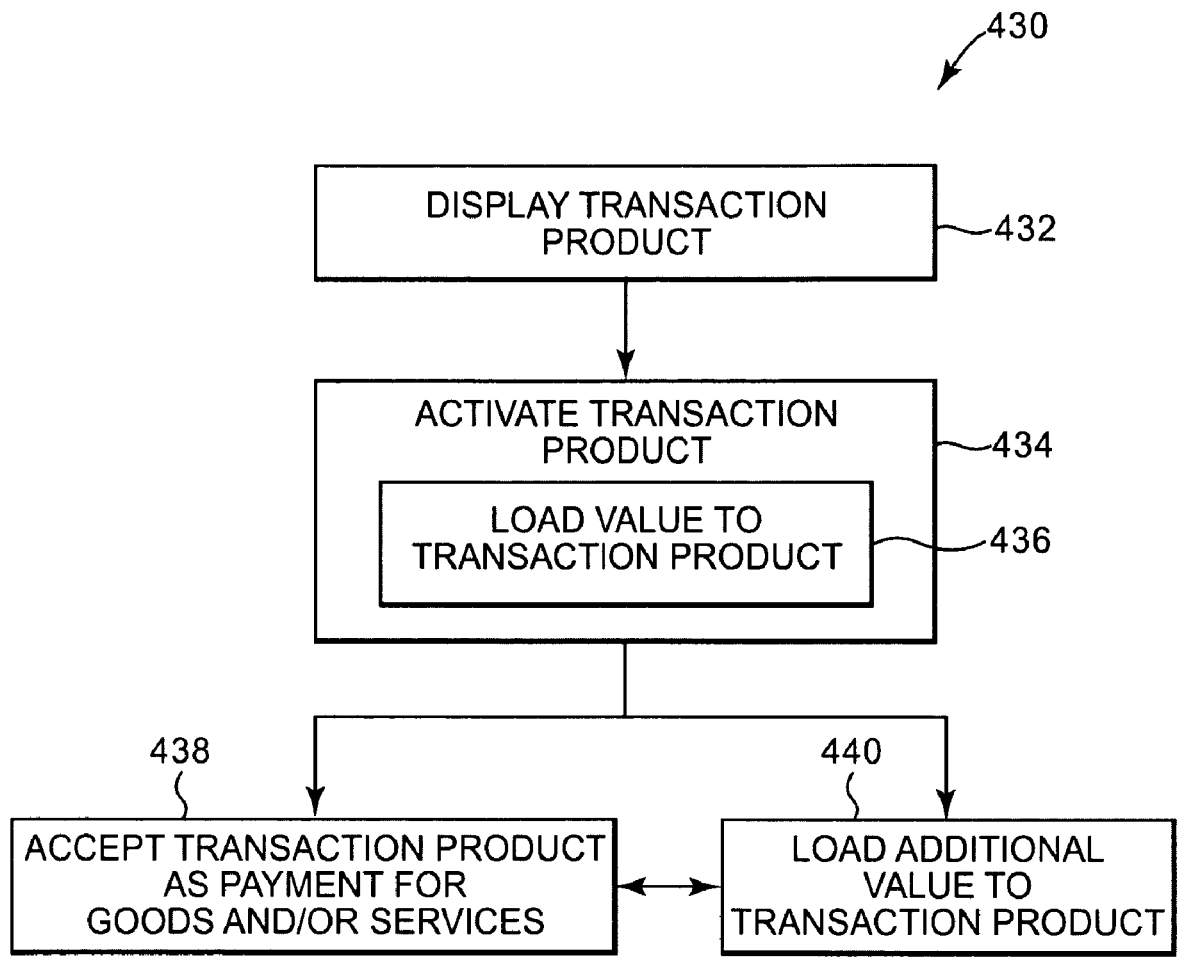
FIG. 16 is a flow chart illustrating a method of encouraging purchase and facilitating use of a transaction product, according to one embodiment of the present invention.

FIG. 16 is a flow chart illustrating one embodiment of a method 430 of providing and supporting use of transaction product 10. At 432, transaction product 10 is displayed to potential consumers. For example, transaction product assembly 306, which includes transaction product 10, is placed on or hung from a rack, shelf or similar device to display transaction product assembly 306 in a retail setting such that transaction product 10 is visible to potential consumers. In one embodiment, transaction product 10 is displayed alone without backer 300 and/or placed on a web site for viewing and purchase by potential consumers.

At 434, a consumer, who has decided to purchase transaction product 10, presents transaction product assembly 306, or at least transaction product 10, to a retail store employee, retail store kiosk or other person or device to scan or otherwise read account identifier 14 of transaction product 10 (e.g., through backer 300) to access the account or record linked to account identifier 14. Upon accessing the account or record, value is added to the account or record at 436. Thus, transaction product 10 is activated and loaded. In one embodiment, wherein a value is associated with transaction product 10 prior to purchase and activation of transaction product 10, operation 436 may be eliminated and activating transaction product 10 at 434 serves to unlock the account or record or otherwise make the predetermined value in the account or record available to a bearer of transaction product 10.

Once transaction product 10 is activated and/or loaded, transaction product 10 can be used by the consumer or any other bearer of transaction product 10 toward the purchase or use of goods and/or services at the retail store or other affiliated retail setting or web site. In one embodiment, where transaction product 10 is displayed on a web site at 432, then, at 434, transaction product 10 may be activated in any suitable method and may be completed without machine scanning of account identifier 14. In one embodiment, transaction product 10 is activated and/or loaded remotely via a telephone or the Internet.

At 438, the retail store or other affiliated retail setting, web site, etc. accepts transaction product 10 as payment toward the purchase or use of goods and/or services made by the current bearer of transaction product 10. More specifically, in one embodiment, the value currently loaded on transaction product 10 is applied toward the purchase of goods and/or services, toward the use of calling minutes, etc. At 440, additional value is optionally loaded on transaction product 10 at a point-of-sale terminal, kiosk, other area of the retail store or related setting, via a web site or by telephone. Upon accepting transaction product 10 as payment at 438, the retail store or related setting can subsequently perform either operation 438 again or operation 440 as requested by a current bearer of transaction product 10. Similarly, upon loading additional value to transaction product 10 at 440, the retail store or related setting can subsequently perform either operation 440 again or operation 438. In one example, the ability to accept transaction product 10 as payment for or toward use of goods and/or services is limited by whether the account or record associated with transaction product 10 has any value at the time of attempted redemption.

Figure 17:
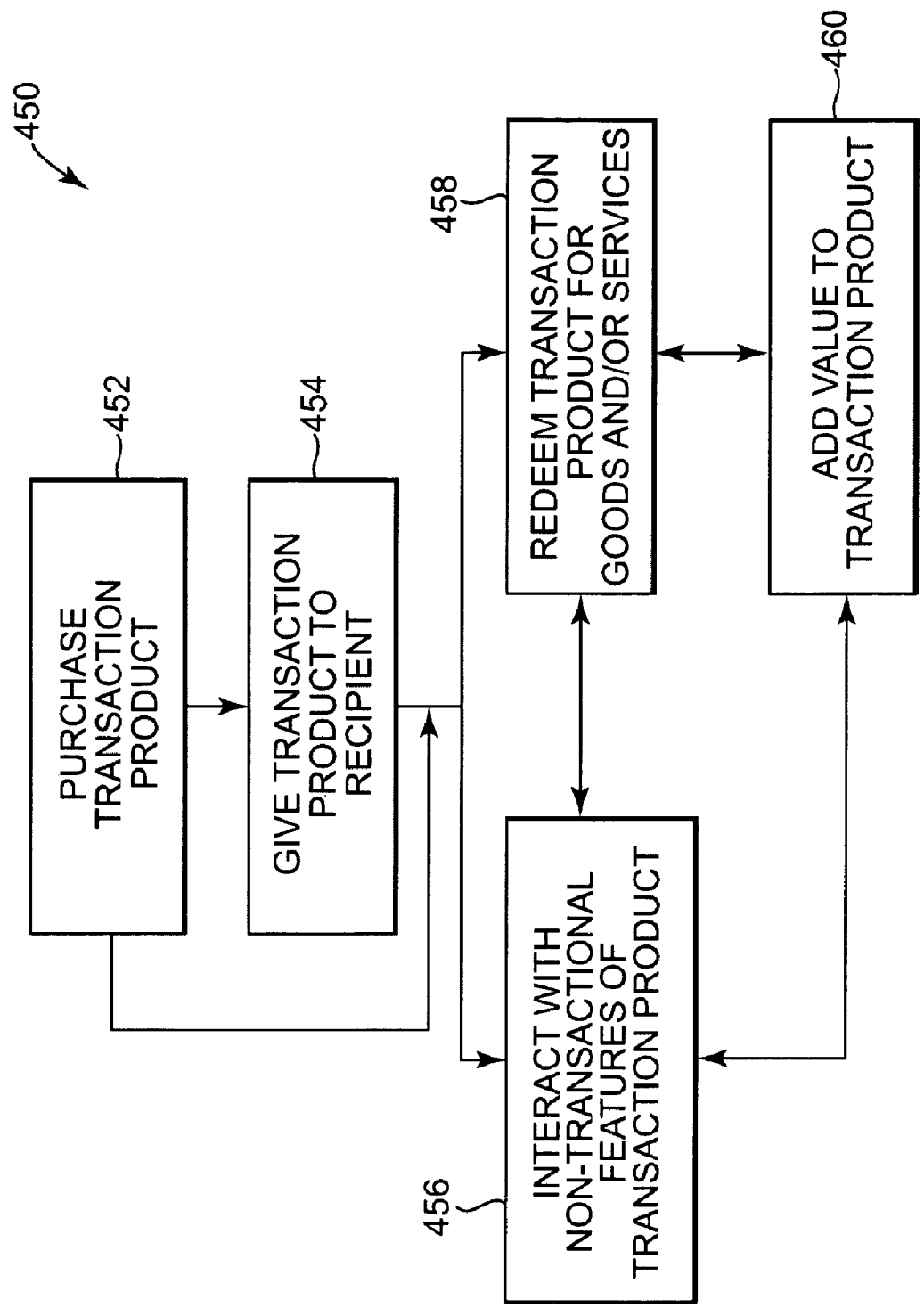
FIG. 17 is a flow chart illustrating a method of using a transaction product, according to one embodiment of the present invention.

FIG. 17 is a flow chart illustrating one embodiment of a method 450 of using transaction product 10. At 352, a potential consumer of transaction product 10, which is displayed in a retail store or viewed on a web site, decides to and does purchase transaction product 10 from the retail store or web site setting. Transaction product 10 can be displayed and purchased alone or as part of transaction product assembly 306. Upon purchasing transaction product 10, a retail store employee, retail store kiosk or other person scans account identifier 14 to activate and/or load value onto transaction product 10. In one embodiment, such as where transaction product 10 is purchased at 452 via a web site, actual scanning of account identifier 14 may be eliminated.

At 454, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, bridal shower, etc. as party favors or gifts. As an alternative, the consumer can keep transaction product 10 for his or her own use thereby eliminating operation 454.

At 456, the consumer or recipient, whoever is in current ownership or otherwise is the current bearer of transaction product 10, uses transaction product 10 for reasons unrelated to its stored-value or transactional features. More specifically, the bearer uses transaction product 10 as a slide viewer.

At 458, the current bearer of transaction product 10 redeems transaction product 10 for goods and/or services from the retail store or web site. Operation 458 may occur before, after or before and after operation 456. At 460, the current bearer of transaction product 10 optionally adds value to transaction product 10 or, more particularly, to the account or record associated with transaction product 10, at the retail store, over the Internet or via telephone. Upon using the non-transactional functionality (i.e., slide-viewing functionality) of transaction product 10 at 456, redeeming transaction product 10 at 458 or adding value to transaction product 10 at 460, the current bearer of transaction product 10 subsequently can perform any of operations 456, 458 or 460 as desired. In one embodiment, the ability of the current bearer to repeat redeeming transaction product 10 at 458 is limited by whether the account or record associated with transaction product 10 has any value at the time of attempted redemption.

Although primarily described above as occurring at single retail store or web site, in one embodiment, purchasing transaction product 10 at 452, redeeming transaction product 10 at 458 and adding value to transaction product 10 at 460, can each be performed at any one of a number of stores adapted to accept transaction product 10 or over the Internet. In one example, the number of stores are each a part of a chain of similarly branded stores. In one example, the number of stores includes at least one web site and/or at least one conventional brick and mortar store.

Stored-value cards and other transaction products come in many forms, according to embodiments of the invention. The gift card or phone card, like other stored-value cards, generally can be "recharged" or "reloaded" at the direction of the original consumer, the gift recipient or third party. The term "loading on" or "loaded on" herein should be interpreted to include adding to the balance of an account or record associated with a transaction product. The balance associated with a stored-value card declines as the card is used, encouraging repeat visits. The card remains in the user's purse or wallet, serving as an advertisement or reminder to revisit the associated merchant. Transaction products, according to an embodiment of the invention, provide a number of advantages to both the consumer and the merchant. Other transaction products according to embodiments of the invention include loyalty cards, merchandise return cards, electronic gift certificates, employee cards, frequency cards, pre-paid cards and other types of cards associated with or representing purchasing power or other value, for example, prepaid telephone calling minutes.

Although the invention has been described to particular embodiments, such embodiments are for illustrative purposes only and should not be considered to limit the invention. Various alternatives and modifications within the scope of the invention in its various embodiments will be apparent to those with ordinary skill in the art.

What is claimed is:

1. A transaction product, comprising:
   a lens;
   a slide depicting a plurality of scenes, each of the plurality of scenes being separately depicted on a different portion of the slide;
   a hub coupled with the slide;
   an actuating mechanism positioned to interact with the hub to cause movement of the slide in a first direction to change which one of the plurality of scenes aligns with and is viewable through the lens at a given time;
   a stop mechanism positioned to interact with the hub to substantially prevent movement of the hub and the slide in a second direction, which is opposite the first direction, wherein the stop mechanism is formed separately from the actuating mechanism, is positioned on an opposite side of the hub than the actuating mechanism and is spaced from the actuating mechanism;
   a housing substantially enclosing the lens, the slide, the actuating mechanism, and the stop mechanism; and
   an account identifier coupled with the housing and linking the transaction product to an account, the account identifier being machine readable by a point-of-sale terminal such that value can be added to or deducted from the account using the account identifier.

2. The transaction product of claim 1, wherein the account identifier includes a bar code.

3. The transaction product of claim 1, wherein the account identifier includes at least one of a magnetic strip, an electronic device and a radio frequency identification device.

4. The transaction product of claim 1, wherein the housing includes a primary panel defining an opening aligning with and positioned opposite the lens, the opening being configured to allow ambient light to light the slide during viewing of the slide through the lens.

5. The transaction product of claim 1, wherein the slide is entirely enclosed within the housing.

6. The transaction product of claim 5, wherein the housing is substantially permanently enclosed around the slide.

7. The transaction product of claim 1, wherein each of the plurality of scenes differs from all others of the plurality of scenes such that no two ones of the plurality of scenes depict similar subject matter.

8. The transaction product of claim 1, wherein:
   the hub includes a plurality of circumferentially spaced pegs, and
   the actuating mechanism is positioned to selectively interface with different ones of the pegs to move the hub and the slide in a first direction.

9. The transaction product of claim 8, wherein the stop mechanism is positioned to selectively interface with the plurality of circumferentially spaced pegs of the hub to substantially prevent movement of the hub and the slide in the second direction.

10. The transaction product of claim 8, wherein:
    the hub rotates about an axis, and
    each of the plurality of circumferentially spaced pegs extends in a direction substantially parallel to the axis.

11. The transaction product of claim 10, wherein:
    the hub includes a substantially planar plate adjacent the slide, and
    each of the plurality circumferentially spaced pegs is coupled to the substantially planar plate opposite the slide and extends substantially perpendicularly away from the substantially planar plate.

12. The transaction product of claim 1, wherein the movement in the first direction is rotational movement.

13. The transaction product of claim 12, wherein the actuating mechanism is biased toward a reference position and is positioned such that user interaction with the actuating mechanism overcomes the bias and linearly moves the actuating mechanism causing advancement of the hub and the slide in the first direction.

14. The transaction product of claim 1, wherein each user interaction with the actuating mechanism linearly moves the actuating mechanism, which, in turn, advances the slide to move a first scene of the plurality of scenes out of alignment with the lens and to move a second scene of the plurality of scenes into alignment with the lens.

15. The transaction product of claim 1, wherein each of the plurality of scenes is immediately adjacent another one of the plurality of scenes.

16. The transaction product of claim 1, wherein:
the housing includes a primary panel having a length of about 8.5 cm and a width of about 5.4 cm, defining an external surface, and being positioned opposite the lens, and
the account identifier is fixedly coupled to the external surface of the primary panel.

17. The transaction product of claim 1, wherein:
the actuating mechanism includes a body and an arm extending away from the body,
the body is moveable in a first linear direction and is biased in the first linear direction to extend out of the housing, and
the arm is moveable in a second linear direction and is biased in the second linear direction toward the hub.

18. A stored-value card, comprising:
a disk assembly;
a cam member including means for selectively interfacing with the disk assembly;
means for receiving an actuating force and for using the actuating force to induce movement of the cam member in a linear direction causing the cam member to interact with and cause rotation of the disk assembly in a first rotational direction, wherein the means for receiving the actuating force is movable in a first linear direction and biased in the first linear direction toward a first position by a first means for biasing, and the cam member is coupled to and biased toward the means for receiving the actuating force in a second linear direction, which is substantially perpendicular to the first linear direction, by a second means for biasing formed separately and spaced from the first means for biasing;
means for supporting each of the disk assembly, the cam member and the means for receiving the actuating force and for using the actuating force; and
means for linking the stored-value card to a financial record having a value associated therewith, the value being accessible for use toward a future purchase using the means for linking, wherein the means for linking is coupled with the means for supporting.

19. The stored-value card of claim 18, wherein the means for supporting includes means for enclosing the disk assembly and the cam member therein.

20. The stored-value card of claim 18, wherein the disk assembly includes a disk and a hub, the disk being a slide depicting a plurality of differing scenes.

21. The stored-value card of claim 20, wherein the disk is formed of a substantially transparent material printed with the plurality of differing scenes.

22. The stored-value card of claim 20, further comprising a lens aligning with one of the plurality of differing scenes, and wherein rotation of the disk assembly changes what one of the plurality of differing scenes aligns with the lens.

23. The stored-value card of claim 20, further comprising means for back lighting the slide to facilitate viewing of the slide through the lens.

24. The stored-value card of claim 18, wherein:
the stored-value card further comprises means for substantially preventing undesired movement of the disk assembly in a second rotational direction opposite the first rotational direction, and
the means for substantially preventing undesired movement of the disk assembly is biased and secured on the means for supporting each of the disk assembly the cam member and the means for receiving the actuating force and for using the actuating force to move independently from the means for receiving the actuating force other than via movement caused by interaction with one or more of the disk assembly and the cam member.

* * * * *

UNITED STATES PATENT AND TRADEMARK OFFICE
CERTIFICATE OF CORRECTION

PATENT NO. : 8,070,068 B2
APPLICATION NO. : 12/340433
DATED : December 6, 2011
INVENTOR(S) : Ted C. Halbur et al.

It is certified that error appears in the above-identified patent and that said Letters Patent is hereby corrected as shown below:

Title page

Item [75], Inventors, delete "Jessica M. Trebrake" and insert --Jessica M. TeBrake--.

Signed and Sealed this
Ninth Day of April, 2013

Teresa Stanek Rea
*Acting Director of the United States Patent and Trademark Office*